(12) United States Patent
Banning et al.

(10) Patent No.: US 7,504,446 B2
(45) Date of Patent: Mar. 17, 2009

(54) AQUEOUS INKS CONTAINING COLORED POLYMERS

(75) Inventors: Jeffery H. Banning, Hillsboro, OR (US); Donald R. Titterington, Newberg, OR (US); Wolfgang G. Wedler, Tualatin, OR (US); Clifford R. King, Hendersonville, NC (US)

(73) Assignee: Xerox Corporation, Norwalk, CT (US)

( * ) Notice: Subject to any disclaimer, the term of this patent is extended or adjusted under 35 U.S.C. 154(b) by 753 days.

(21) Appl. No.: 10/682,561

(22) Filed: Oct. 9, 2003

(65) Prior Publication Data

US 2006/0074142 A1  Apr. 6, 2006

(51) Int. Cl.
*C08F 222/40* (2006.01)
*C08J 3/00* (2006.01)
*C08K 9/00* (2006.01)
*C08L 37/00* (2006.01)
*C08L 39/00* (2006.01)
*C09B 67/00* (2006.01)
*C09D 5/00* (2006.01)
*C09D 11/00* (2006.01)

(52) U.S. Cl. .................. 523/160; 523/161; 523/200; 523/205; 524/548; 524/549

(58) Field of Classification Search ............... 523/160, 523/161, 200, 205; 524/548, 549
See application file for complete search history.

(56) References Cited

U.S. PATENT DOCUMENTS

| | | | |
|---|---|---|---|
| 3,563,931 A * | 2/1971 | Horiguchi et al. ........... 526/192 |
| 4,251,824 A | 2/1981 | Hara et al. .............. 346/140 R |
| 4,308,547 A | 12/1981 | Lovelady et al. ........ 346/140 R |
| 4,410,899 A | 10/1983 | Haruta et al. ........... 346/140 R |
| 4,412,224 A | 10/1983 | Sugitani ...................... 346/1.1 |
| 4,532,530 A | 7/1985 | Hawkins ................. 346/140 R |
| 4,601,777 A | 7/1986 | Hawkins et al. ............. 156/626 |
| 4,697,195 A | 9/1987 | Quate et al. ............. 346/140 R |
| 4,751,529 A | 6/1988 | Elrod et al. ............. 346/140 R |
| 4,751,530 A | 6/1988 | Elrod et al. ............. 346/140 R |
| 4,751,534 A | 6/1988 | Elrod et al. ............. 346/140 R |
| 4,797,693 A | 1/1989 | Quate ...................... 346/140 R |
| 4,801,953 A | 1/1989 | Quate ...................... 346/140 R |
| 4,963,188 A * | 10/1990 | Parker ........................ 524/549 |
| 5,028,937 A | 7/1991 | Khuri-Yakub et al. ... 346/140 R |
| 5,041,849 A | 8/1991 | Quate et al. ............. 346/140 R |
| 5,064,921 A * | 11/1991 | Blum et al. .................. 526/262 |
| 5,648,405 A * | 7/1997 | Ma et al. ..................... 523/160 |
| 6,110,264 A | 8/2000 | Banning et al. .......... 106/31.29 |
| 6,127,198 A | 10/2000 | Coleman et al. .............. 438/21 |
| 6,232,405 B1 * | 5/2001 | Schmidhauser et al. .. 525/327.6 |
| 6,322,624 B1 | 11/2001 | Titterington et al. ........ 106/311 |
| 6,590,012 B2 * | 7/2003 | Miyabayashi ............... 523/160 |
| 6,764,541 B1 * | 7/2004 | Banning et al. .......... 106/31.29 |
| 6,790,267 B1 * | 9/2004 | Banning et al. .......... 106/31.29 |
| 6,916,367 B2 * | 7/2005 | Palumbo ...................... 106/473 |
| 7,001,934 B2 * | 2/2006 | Bromberg ................... 523/160 |
| 7,034,185 B2 * | 4/2006 | Banning et al. ............. 564/443 |
| 7,084,189 B2 * | 8/2006 | Banning et al. ............. 523/160 |
| 7,094,812 B2 * | 8/2006 | Banning et al. ............. 523/160 |

FOREIGN PATENT DOCUMENTS

| | | | |
|---|---|---|---|
| EP | 303987 A2 * | 2/1989 |
| GB | 2 344 825 | 6/2000 |

OTHER PUBLICATIONS

Cherioux, F., Audebert, P., Maillotte, H., Grossard, L., Hernandez, F.E., and Lacourt, A.; "New Third-Order Nonlinear Polymers Functionalized with Disperse Red and Disperse Orange Chromophores With Increased Stability"; Chem. Mater. 1997, 9, 2921-2927.*

K. A. Krause, "Focusing Ink Jet Head," *IBM Technical Disclosure Bulletin*, vol. 16, No. 4, Sep. 1973, pp. 1168-1170.

* cited by examiner

*Primary Examiner*—Patrick D Niland
(74) *Attorney, Agent, or Firm*—Judith L. Byorick

(57) ABSTRACT

Disclosed is an ink composition comprising (a) an aqueous liquid vehicle, and (b) a colorant which comprises an anhydride copolymer having at least one chromogen covalently bonded thereto and at least one ester, amide, imide, or thioester group covalently bonded thereto, said colorant being soluble or dispersible in the aqueous liquid vehicle. Also disclosed is an ink composition comprising (a) an aqueous liquid vehicle, and (b) a colorant which is the reaction product of (1) an anhydride copolymer, (2) a chromogen having one and only one group per molecule selected from the group consisting of —OH, —SH, primary amino, and secondary amino, and (3) a material selected from the group consisting of nonchromogenic monofunctional alcohols, nonchromogenic monofunctional thiols, nonchromogenic monofunctional primary or secondary amines, and mixtures thereof, said colorant being soluble or dispersible in the aqueous liquid vehicle.

38 Claims, No Drawings

AQUEOUS INKS CONTAINING COLORED POLYMERS

CROSS-REFERENCE TO COPENDING APPLICATIONS

Application U.S. Ser. No. 10/422,755, filed Apr. 24, 2003, now U.S. Pat. No. 7,034,185, entitled "Colorant Precursor Compositions," with the named inventors Jeffery H. Banning, Donald R. Titterington, and Clifford R. King, the disclosure of which is totally incorporated herein by reference, discloses colorant precursor compounds of the formula

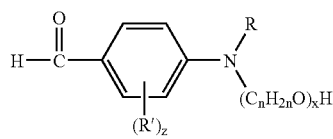

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said colorant precursor has no more than one —OH, —SH, or primary or secondary amino group per molecule.

Application U.S. Ser. No. 10/422,897, filed Apr. 24, 2003, now U.S. Pat. No. 6,790,267, entitled "Colorant Compositions," with the named inventors Jeffery H. Banning, Donald R. Titterington, and Clifford R. King, the disclosure of which is totally incorporated herein by reference, discloses colorant compounds of the formula

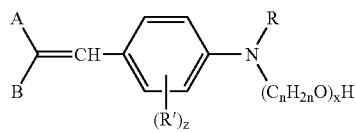

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule.

Application U.S. Ser. No. 10/422,895, filed Apr. 24, 2003, now U.S. Pat. No. 7,094,812, entitled "Colorant Compositions," with the named inventors Jeffery H. Banning, Donald R. Titterington, and Clifford. R. King, the disclosure of which is totally incorporated herein by reference, discloses colorant compounds of the formula

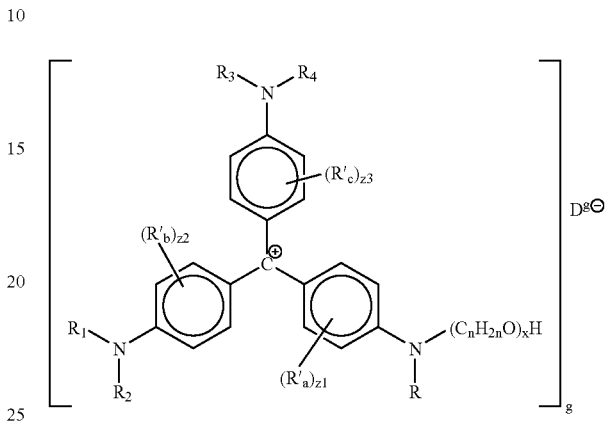

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R'_b$, and $R'_c$, independently of the others, is a halogen atom, an alkyl group, an alkoxy group, a nitrile group, a nitro group, an amide group, or a sulfonamide group, $z_1$, $z_2$, and $z_3$ each, independently of the others, is an integer of 0, 1, 2, 3, or 4, n is an integer representing the number of carbon atoms in each repeat alkylene oxide unit, x is an integer representing the number of repeat alkylene oxide units, D is an anion, and g is the charge on the anion, wherein said colorant has no more than one —OH, —SH, or primary or secondary amino group per molecule.

Application U.S. Ser. No. 10/422,742, filed Apr. 24, 2003, now U.S. Pat. No. 6,764,541, entitled "Colorant Compositions," with the named inventors Jeffery H. Banning, Donald R. Titterington, and Clifford R. King, the disclosure of which is totally incorporated herein by reference, discloses colorant composition of the formula

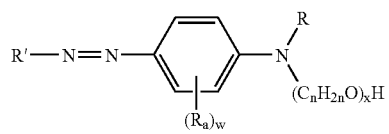

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule.

Application U.S. Ser. No. 10/369,981, filed Feb. 20, 2003, now U.S. Pat. No. 7,084,189, entitled "Phase Change Inks With Isocyanate-Derived Antioxidants and UV Stabilizers," with the named inventors Jeffery H. Banning, Donald R. Titterington, and Mary Ryan-Hotchkiss, the disclosure of which is totally incorporated herein by reference, discloses a phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group. Also disclosed is a compound comprising the reaction product of (i) a diisocyanate, (ii) an antioxidant or UV stabilizer molecule having thereon (A) at least one isocyanate-reactive hydroxyl group and/or (B) at least one isocyanate-reactive primary or secondary amino group, and (iii) a chromophore having thereon (A) at least one isocyanate-reactive hydroxyl group and/or (B) at least one isocyanate-reactive primary or secondary amino group.

BACKGROUND

Disclosed herein are aqueous ink compositions. More particularly, disclosed herein are aqueous ink compositions having colorants which are colored polymers. One specific embodiment is directed to an ink composition comprising (a) an aqueous liquid vehicle, and (b) a colorant which comprises an anhydride copolymer having at least one chromogen covalently bonded thereto and at least one ester, amide, imide, or thioester group covalently bonded thereto, said colorant being soluble or dispersible in the aqueous liquid vehicle. Another specific embodiment is directed to an ink composition comprising (a) an aqueous liquid vehicle, and (b) a colorant which is the reaction product of (1) an anhydride copolymer, (2) a chromogen having one and only one group per molecule selected from the group consisting of —OH, —SH, primary amino, and secondary amino, and (3) a material selected from the group consisting of nonchromogenic monofunctional alcohols, nonchromogenic monofunctional thiols, nonchromogenic monofunctional primary or secondary amines, and mixtures thereof, said colorant being soluble or dispersible in the aqueous liquid vehicle.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168-1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801, 953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (1 May 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

Aqueous inks are also used in marking pens, such as felt tipped pens, roller ball pens, fountain pens, ballpoint pens, and the like for applications such as highlighters, indelible markers, writing implements, gravure printing, offset printing, and the like.

U.S. Pat. No. 6,322,624 (Titterington et al.), the disclosure of which is totally incorporated herein by reference, discloses the reaction product of at least one polyanhydride and at least one amine. A phase change ink composition and a phase change ink containing the polyanhydride/amine adduct are also disclosed.

U.S. Pat. No. 6,110,264 (Banning et al.), the disclosure of which is totally incorporated herein by reference, discloses a phase change ink carrier composition comprising at least one anhydride/alcohol inclusive reaction product.

British Patent GB 2 344 825 (James et al.), the disclosure of which is totally incorporated herein by reference, discloses an ink having a viscosity less than 20 cp at 20° C. comprising (i) a coloured polymer obtained by colouration of a polymer having anhydride groups and (ii) a liquid medium. The polymer is obtained from the polymerisation of maleic anhydride monomers and the liquid medium comprises water and an organic solvent. The ink is suitable for use in jet printing.

While known compositions and processes are suitable for their intended purposes, a need remains for improved aqueous inks. In addition, a need remains for aqueous inks that have colorants soluble therein, even at high pH values. Further, a need remains for aqueous inks that exhibit desirably high waterfastness. Additionally, a need remains for aqueous inks that exhibit desirable smear resistance when dried. There is also a need for aqueous inks having colorants that do not precipitate out of the ink. In addition, there is a need for aqueous inks that exhibit reduced or no feathering of the colorant away from the initial point of ink contact on the recording substrate. Further, there is a need for aqueous inks that can generate images with desirably high resolution. Additionally, there is a need for aqueous inks that generate images that exhibit reduced or no smear when rewetted after drying. A need also remains for aqueous inks containing polymers that do not precipitate out of the ink. In addition, a need remains for aqueous inks that are suitable for applications such as ink jet printing. Further, a need remains for aqueous inks for which the characteristics of the colorant, such as glass transition temperature ($T_g$), melting point, solubility or dipersibility in the aqueous liquid vehicle, and the like can be tailored by altering the characteristics of the colorant. Additionally, a need remains for aqueous inks for which characteristics such as humectancy, coefficient of friction of prints generated with the ink, blocking, feathering, intercolor bleed, optical density, waterfastness, kogation, and the like can be tailored by altering the characteristics of the colorant.

SUMMARY

Disclosed herein is an ink composition comprising (a) an aqueous liquid vehicle, and (b) a colorant which comprises an anhydride copolymer having at least one chromogen covalently bonded thereto and at least one ester, amide, imide, or thioester group covalently bonded thereto, said colorant being soluble or dispersible in the aqueous liquid vehicle. Also disclosed is an ink composition comprising (a) an aqueous liquid vehicle, and (b) a colorant which is the reaction product of (1) an anhydride copolymer, (2) a chromogen having one and only one group per molecule selected from the group consisting of —OH, —SH, primary amino, and secondary amino, and (3) a material selected from the group consisting of nonchromogenic monofunctional alcohols, nonchromogenic monofunctional thiols, nonchromogenic monofunctional primary or secondary amines, and mixtures thereof, said colorant being soluble or dispersible in the aqueous liquid vehicle.

DETAILED DESCRIPTION

The inks contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions the liquid vehicle is typically present in an amount of from about 80 to about 99.9 percent by weight of the ink, and preferably from about 90 to about 99 percent by weight of the ink, although the amount can be outside these ranges.

The inks also contain a colorant that is an anhydride copolymer having at least one chromogen covalently bonded thereto and at least one ester, amide, imide, or thioester group covalently bonded thereto.

For the purposes of the discussion herein, the term "chromogen" will be used to refer both to groups of atoms that impart color to a molecule and to molecules that are colored. By "color" and "colored" is meant that the molecule absorbs light in the visible wavelength range.

The anhydride monomer of the copolymer can be any desired or effective monomer or mixture of monomers capable of forming a copolymer with another monomer or mixture of monomers and containing an anhydride group. Examples of suitable anhydride monomers used to generate the anhydride-based repeat units in the copolymer include maleic anhydride, itaconic anhydride, dimethyl maleic anhydride, chloromaleic anhydride, bromomaleic anhydride, iodomaleic anhydride, dichloromaleic anhydride, dibromomaleic anhydride, diiodomaleic anhydride, and the like, as well as mixtures thereof.

The comonomer of the copolymer can be one monomer or a mixture of monomers. This comonomer generally is an olefinically unsaturated comonomer having no anhydride groups thereon. Suitable olefinically unsaturated comonomers for generating nonanhydride-based repeat units in the anhydride copolymer are of the general formula

wherein $X_1$, $X_2$, $X_3$, and $X_4$ each, independently of the others, is a hydrogen atom, a halogen atom (including fluorine atoms, chlorine atoms, bromine atoms, and iodine atoms), a hydroxy group, an amine group (including primary, secondary, and tertiary amine groups), an ammonium group, a cyano group, a pyridine group, a pyridinium group, an ether group, a carbonyl group, a thiocarbonyl group, an aldehyde group, a ketone group, an ester group, an amide group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azide group, an azo group, a cyanato group, an isocyanato group, a thiocyanato group, an isothiocyanato group, a carboxylate group, a carboxylic acid group, a urethane group, a urea group, an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 32 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 50 carbon atoms, although the number of carbon atoms can be outside of these ranges, such as benzyl or the like, or an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 50 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. It should be noted that since the alkyl, aryl, arylalkyl, and alkylaryl groups can include hetero atoms therein, these terms also encompass alkoxy, aryloxy, arylalkyloxy, and alkylaryloxy groups for the purposes of the discussion herein. Specific examples of suitable comonomers include (but are not limited to) olefinically unsaturated compounds, such as: butadiene, stilbene (1,2-diphenylethene), and the like; alpha-olefins, such as ethylene, 1-propylene, 1-butylene, 1-octadecene, and the like; vinyl ethers, such as vinyl ether (divinyl ether; divinyl oxide), methoxyvinylether, methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, dimethylaminoethyl vinyl ether, and the like; styrenes, such as styrene, methylstyrene, dimethylstyrene, trimethylstyrene, ethylstyrene, diethylstyrene, isopropylstyrene, butylstyrene, hexylstyrene, cyclohexylstyrene, decylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, trifluorostyrene, 2-bromo-4-trifluoromethylstyrene, and the like; olefinically unsaturated acids, such as acrylic acid, methacrylic acid, itaconic acid, maleic acid, citraconic acid, styrene sulfonic acid, vinylbenzylsulfonic acid, vinyl sulfonic acid, and the like; acrylates and methacrylates, such as methyl acrylate, ethyl acrylate, n-propyl acrylate, isopropyl acrylate, n-butyl acrylate, isobutyl acrylate, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydoxypropyl acrylate, 2-methoxyethyl acrylate, 3-methoxybutyl acrylate, 2-ethoxyethyl acrylate, 2-isopropoxyethyl acrylate, 2-butoxyethyl acrylate, 2-(2-methoxyethoxy)ethyl acrylate, 2-(2-butoxyethoxy) ethyl acrylate, 1-bromo-2-methoxyethyl acrylate, 1,1-dichloro-2-ethoxyethyl acrylate, methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate, benzylmethacrylate, chlorobenzyl methacrylate, octyl methacrylate, N-ethyl-N-phenylaminoethyl methacrylate, 2-(3-phenylpropyloxy)ethyl methacrylate, dimethylaminophenoxyethyl methacrylate, furfuryl methacrylate, and the like; acrylamides and methacrylamides, such as acrylamide, methylacrylamide, tert-butylacrylamide, tert-octylacrylamide, benzylacrylamide, cyclohexylacrylamide, phenylacrylamide, dimethylacrylamide, dipropylacrylamide, hydroxyethyl-N-methylacrylamide, N-methylphenylacrylamide, N-ethyl-N-phenylacrylamide, methylmethacrylamide, tert-butylmethacrylamide, tert-octylmethacrylamide, benzylmethacrylamide, cyclohexylmethacrylamide, phenylmethacrylamide, dimethylmethacrylamide, dipropylmethacrylamide, hydroxyethyl-N-methylmethocrylamide, N-methylphenylmethacrylamide, N-ethyl-N-phenylmethacrylamide, methacrylhydrazine, and the like; vinyl ketones, such as methyl vinyl ketone, phenyl vinyl ketone, methoxyethyl vinyl ketone, and the like; vinyl halides and vinylidene halides, such as vinyl chloride, vinylidene chloride, chlorotrifluoro ethylene, and the like; unsaturated nitriles, such as acrylonitrile, methacyrlonitrile, and the like; unsaturated esters, such as vinyl acetate; and the like, as well as mixtures thereof.

For the purposes of the discussion herein, the terms "polymer" and "copolymer" are to be construed as including oligomers as well as polymers.

The anhydride copolymer can have any desired or effective number average molecular weight, in one embodiment at least about 500, in another embodiment at least about 750, and in yet another embodiment at least about 1,000, and in one embodiment no more than about 75,000, in another embodiment no more than about 50,000, and in yet another embodiment no more than about 20,000, although the number average molecular weight can be outside of these ranges.

The anhydride copolymer is reacted with a chromogen having exactly one —OH, —SH, or primary or secondary amino group per molecule to generate the anhydride copolymer having the chromogen covalently bonded thereto. Examples of suitable chromogens for generating the anhydride copolymer having the chromogen covalently bonded thereto include those of the formula

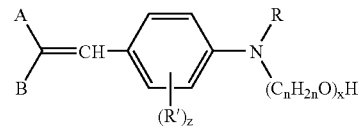

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule, which can be prepared as disclosed in Application U.S. Ser. No. 10/422,897, the disclosure of which is totally incorporated herein by reference; those of the formula

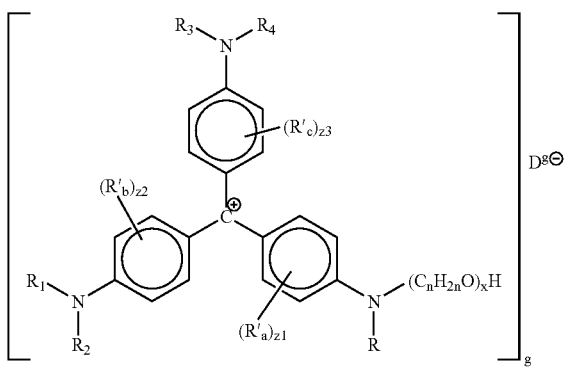

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R'_b$, and $R'_c$, independently of the others, is a halogen atom, an alkyl group, an alkoxy group, a nitrile group, a nitro group, an amide group, or a sulfonamide group, $z_1$, $z_2$, and $z_3$ each, independently of the others, is an integer of 0, 1, 2, 3, or 4, n is an integer representing the number of carbon atoms in each repeat alkylene oxide unit, x is an integer representing the number of repeat alkylene oxide units, D is an anion, and g is the charge on the anion, wherein said colorant has no more than one —OH, —SH, or primary or secondary amino group per molecule, which can be prepared as disclosed in Application U.S. Ser. No. 10/422,895, the disclosure of which is totally incorporated herein by reference; those of the formula

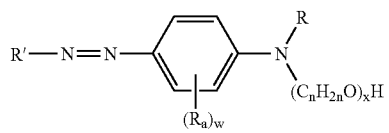

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule, which can be prepared as disclosed in Application U.S. Ser. No. 10/422,742, the disclosure of which is totally incorporated herein by reference; Disperse Red 13 (C.I. 11115), of the formula

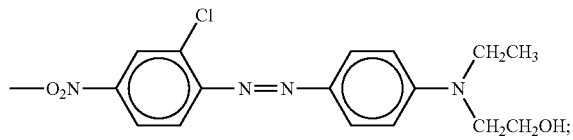

Disperse Blue 34 (C.I. 61510), of the formula

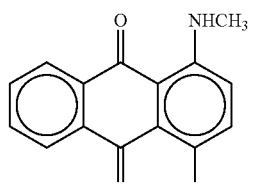

Disperse Red 156 (C.I. 11235), of the formula

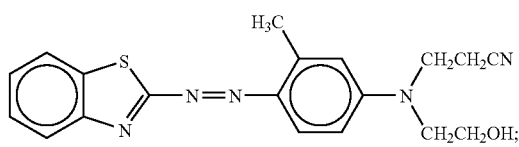

Disperse Red 90 (C.I. 11343), of the formula

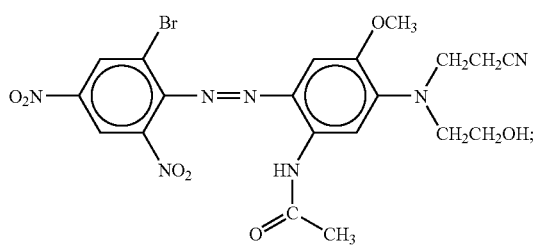

Disperse Blue 85 (C.I. 11370), of the formula

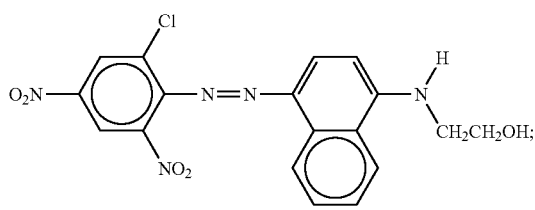

Disperse Blue 8 (C.I. 60742), of the formula

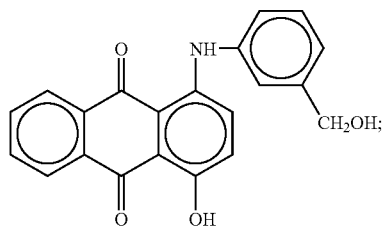
Disperse Red 91 (C.I. 60753), of the formula
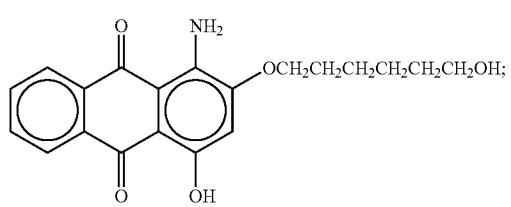
Disperse Red 55 (C.I. 60757), of the formula
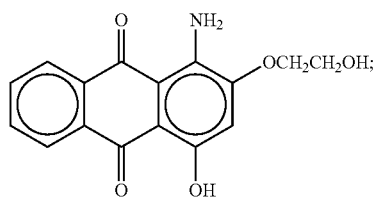
Disperse Red 1 (C.I. 11110), of the formula
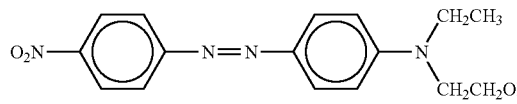
Disperse Blue 3 (C.I. 61505), of the formula
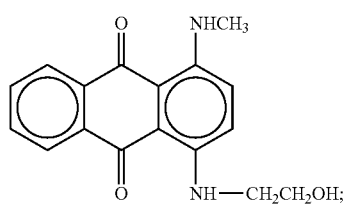
Basic Blue 41 (C.I. 11105), of the formula
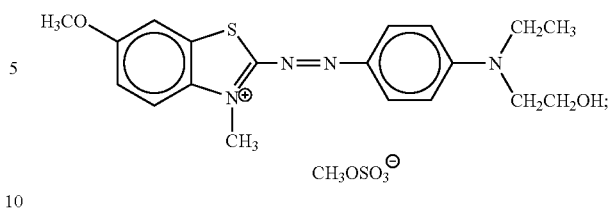
Disperse Red 8 (C.I. 11113), of the formula
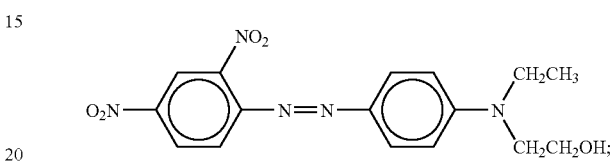
Disperse Red 98 (C.I. 11191), of the formula
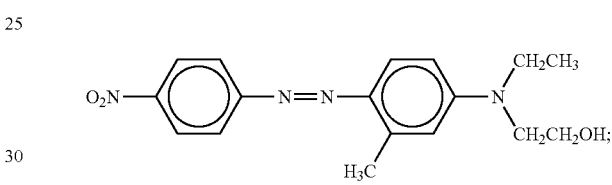
Disperse Red 109 (C.I. 11192), of the formula
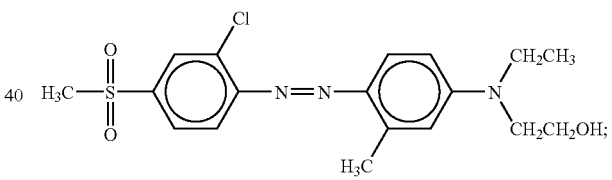
Disperse Red 97 (Cl. 11232), of the formula
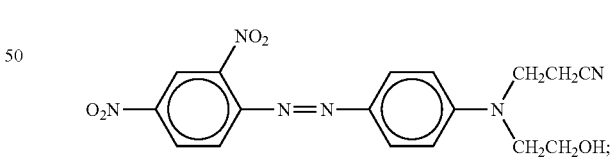
colorants of the formulae
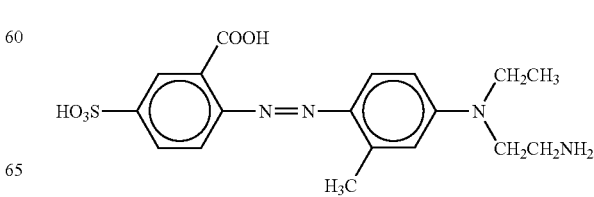
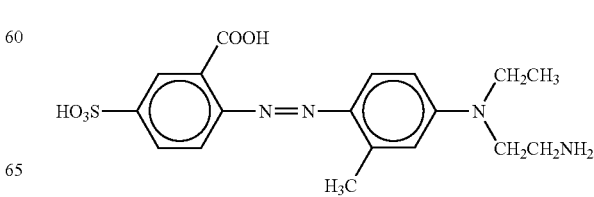

-continued

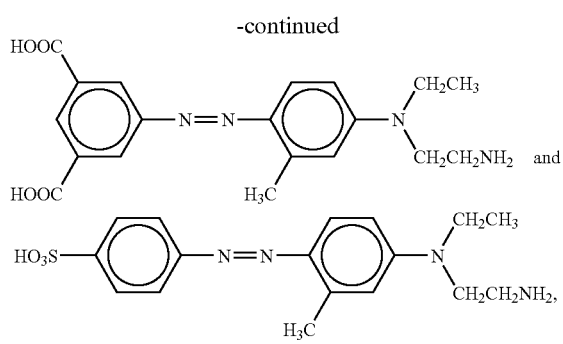

prepared as disclosed in British Patent GB 2 344 825, the disclosure of which is totally incorporated herein by reference; and the like, as well as mixtures thereof. If desired, a mixture of chromogens each having a single hydroxy group can also be reacted with the anhydride copolymer to achieve a colored polymer having a desired color that is obtained by mixing the two chromogens.

During the reaction to form the anhydride copolymer covalently bonded to the chromogen, the chromogen and the anhydride copolymer are present in any desired or effective relative amounts, in one embodiment at least about 1.1 moles of anhydride repeat monomer units per every one mole of chromogen, in another embodiment at least about 2 moles of anhydride repeat monomer units per every one mole of chromogen, and in yet another embodiment at least about 3 moles of anhydride repeat monomer units per every one mole of chromogen, and in one embodiment no more than about 20 moles of anhydride repeat monomer units per every one mole of chromogen, in another embodiment no more than about 10 moles of anhydride repeat monomer units per every one mole of chromogen, and in yet another embodiment no more than about 5 moles of anhydride repeat monomer units per every one mole of chromogen, although the relative amounts of chromogen and anhydride copolymer can be outside of these ranges.

The reaction between the chromogen and the anhydride copolymer can take place at any desired or effective temperature, in one embodiment at least about 25° C., in another embodiment at least about 40° C., and in yet another embodiment at least about 60° C., and in one embodiment no more than about 200° C., in another embodiment no more than about 160° C., and in yet another embodiment no more than about 120° C., although the temperature can be outside of these ranges.

The reaction between the chromogen and the anhydride copolymer can take place for any desired or effective period of time, in one embodiment at least about 15 minutes, in another embodiment at least about 12 hours, and in yet another embodiment at least about 2 days, and in one embodiment no more than about 100 hours, and in another embodiment no more than about 2 days, although the time can be outside of these ranges.

The reaction between the chromogen and the anhydride copolymer can be carried out neat, in the absence of a solvent. Optionally, if desired, a solvent can be employed. Examples of suitable solvents include acetonitrile, methylene chloride, tetrahydrofuran, diethyl ether, diglyme, toluene, or the like, as well as mixtures thereof. When present, the optional solvent is present in any desired or effective amount, typically at least about 3 parts by weight solvent per every 1 part by weight reaction solids, and typically no more than about 10 parts by weight solvent per every 1 part by weight reaction solids, although the amount of solvent can be outside of these ranges.

An example of such a reaction, illustrated below with a styrene/maleic anhydride copolymer and a chromogen having one —OH group, is believed to proceed as follows:

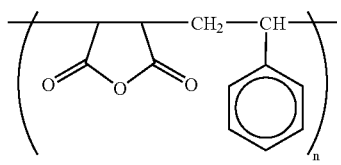

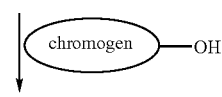

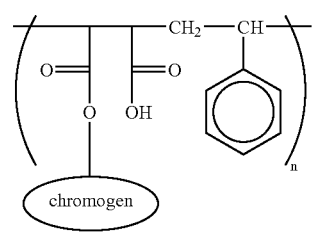

While not being limited to any particular theory, it is believed that at certain pH values, such as the presence of a base, such as lithium hydroxide, sodium hydroxide, potassium hydroxide, ammonia, triethylamine, triethanolamine, quaternary ammonium hydroxides, or the like, as well as mixtures thereof, the polymer becomes solubilized or dispersed in the aqueous vehicle of the ink, as follows (illustrated for the instance wherein the base is ammonia):

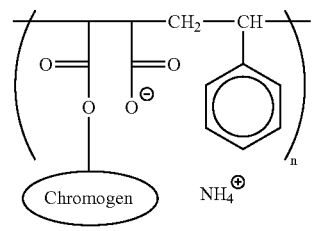

Upon drying of the ink on a recording substrate, the base evaporates, returning the polymer to its previous nonsolubilized form, thereby rendering it insoluble if water subsequently contacts the substrate. The covalent bond of the chromogen to the polymer also is believed to prevent feathering of the ink as it penetrates the recording substrate.

The reaction is similar when the chromogen is a monofunctional thiol:

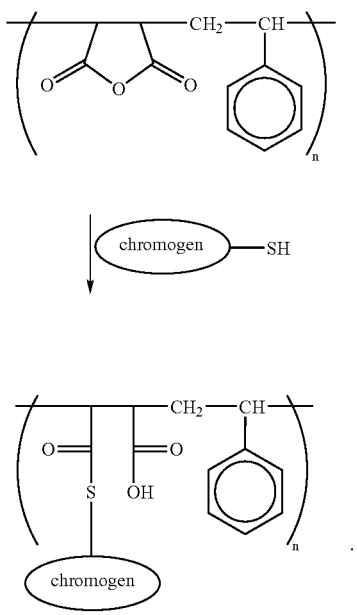

Similarly, when the chromogen is a monofunctional amine, the reaction is believed to proceed as follows (illustrated for the instance wherein the chromogen is a monofunctional primary amine:

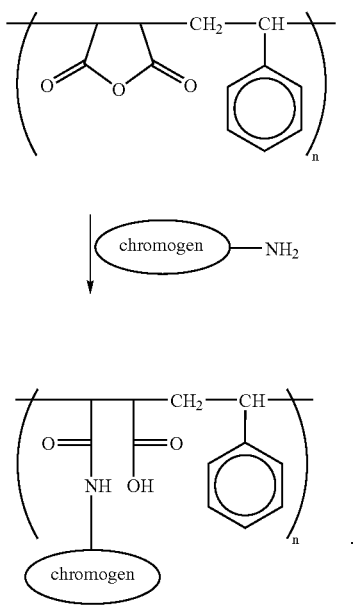

The polymer can be used in the ink in this form (the amic acid form) if so desired. Alternatively, if desired, the polymer in the amic acid form can be heated (typically to temperatures of about 160° C. or higher, although the temperature can be outside of this range) to convert the amic acid to the imide form, as follows:

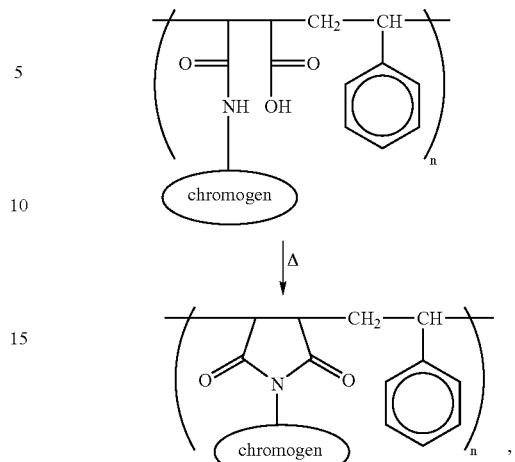

The anhydride copolymer is also reacted with a nonchromogenic monofunctional alcohol, a nonchromogenic monofunctional thiol, and/or a nonchromogenic primary or secondary amine to place thereon at least one ester, amide, imide, or thioester group covalently bonded thereto. By "nonchromogenic" is meant that the alcohol, thiol, or amine contains no chromogens and is not itself a chromogen. By so doing, groups are covalently bonded to the polymer backbone that affect the properties of the polymer, such as solubility or dispersibility in the aqueous liquid vehicle of the ink, waterfastness, glass transition temperature, melting point and the like, and can tailor the polymer to impart desirable characteristics to the ink containing it such as humectancy, coefficient of friction of prints generated with the ink, blocking, feathering, intercolor bleed, optical density, waterfastness, kogation, and the like. Examples of suitable nonchromogenic monohydroxyl alcohols, nonchromogenic monofunctional thiols, and nonchromogenic monofunctional amines include those of the general formulae

R—OH R—SH R—NHR' wherein R and R' each, independently of the other, are alkyl groups (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 50 carbon atoms, although the number of carbon atoms can be outside of these ranges, arylalkyl groups (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 50 carbon atoms, although the number of carbon atoms can be outside of these ranges, such as benzyl or the like, or alkylaryl groups (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 50 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, and wherein R' can also be a hydrogen atom.

Specific examples of suitable nonchromogenic alcohols and amines include methanol, ethanol, linear and branched propanols, linear and branched butanols, linear and branched pentanols, linear and branched hexanols, linear and branched heptanols, linear and branched octanols, linear and branched nonanols, linear and branched decanols, linear and branched undecanols, linear and branched dodecanols, linear and branched tridecanols, linear and branched tetradecanols, linear and branched pentadecanols, linear and branched hexadecanols, linear and branched heptadecanols, linear and branched octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, benzyl alcohol, octylphenol ethoxylate, octyl, nonyl, and dodecylphenol alkoxylates of octyl, nonyl, and dodecylphenol, and alkoxyphenol, phenol, naphthol, hydroabietyl alcohol, cholesterol, vitamin E, N,N-dimethyl-N-ethanolamine, stearamide-monoethanolamine, tripropylene glycol monomethyl ether, hydroxybutanone, menthol, isobomeol, terpineol, 12-hydroxy stearyl stearamide, $C_{11}H_{22}O$—$(CH_2CH_2O)_nH$ wherein n has an average value of 3 (NEODOL 1-3, available from Shell Chemical Company, Houston, Tex.), methyl amine, ethyl amine, linear and branched propyl amines, linear and branched butyl amines, linear and branched pentyl amines, linear and branched hexyl amines, linear and branched heptyl amines, linear and branched octyl amines, linear and branched nonyl amines, linear and branched decyl amines, linear and branched undecyl amines, linear and branched dodecyl amines, linear and branched tridecyl amines, linear and branched tetradecyl amines, linear and branched pentadecyl amines, linear and branched hexadecyl amines, linear and branched heptadecyl amines, linear and branched octadecyl amines, dimethyl amine, diethyl amine, linear and branched dipropyl amines, linear and branched dibutyl amines, linear and branched dipentyl amines, linear and branched dihexyl amines, dicyclohexyl amine, linear and branched diheptyl amines, linear and branched dioctyl amines, linear and branched dinonyl amines, linear and branched didecyl amines, linear and branched diundecyl amines, linear and branched didodecyl amines, linear and branched ditridecyl amines, linear and branched ditetradecyl amines, linear and branched dipentadecyl amines, linear and branched dihexadecyl amines, linear and branched diheptadecyl amines, linear and branched dioctadecyl amines, 2-ethylhexyl amine, cyclohexyl amine, 2,3-dimethyl-1-cyclohexylamine, piperidine, pyrrolidine, benzyl amine, aniline, anisidine, rosin amine, abietic amine, dehydroabietyl amine, dihydroabietyl amine, hydroabietyl amine, adamantyl amine, isonipecotamide, polyoxyalkylenemonoamines such as the M-series Jeffamines commercially available from Huntsman Chemical Co., of Austin, Tex., 3,3'-diamino-N-methyldipropylamine, methyl mercaptan, ethyl mercaptan, linear and branched propyl mercaptans, linear and branched butyl mercaptans, linear and branched pentyl mercaptans, linear and branched hexyl mercaptans, linear and branched heptyl mercaptans, linear and branched octyl mercaptans, linear and branched nonyl mercaptans, linear and branched decyl mercaptans, linear and branched undecyl mercaptans, linear and branched dodecyl mercaptans, linear and branched tridecyl mercaptans, linear and branched tetradecyl mercaptans, linear and branched pentadecyl mercaptans, linear and branched hexadecyl mercaptans, linear and branched heptadecyl mercaptans, linear and branched octadecyl mercaptans, 3-cyclohexyl-1-propyl mercaptan, 2-cyclohexyl-1-ethyl mercaptan, cyclohexylmethyl mercaptan, cyclohexyl mercaptan, 4-methyl cyclohexyl mercaptan, 4-ethylcyclohexyl mercaptan, 4-t-butylcyclohexyl mercaptan, benzyl mercaptan, phenyl mercaptan, naphthyl mercaptan, hydroabietyl mercaptan, and the like, as well as mixtures thereof.

The nonchromogenic monohydroxyl alcohol, nonchromogenic monofunctional thiol, nonchromogenic monofunctional amine, or mixture thereof is present in any desired or effective amount, in one embodiment at least about 1.1 moles of anhydride repeat monomer units per every one mole of nonchromogenic monofunctional alcohol, thiol, and/or amine, in another embodiment at least about 2 moles of anhydride repeat monomer units per every one mole of nonchromogenic monofunctional alcohol, thiol, and/or amine, and in yet another embodiment at least about 3 moles of anhydride repeat monomer units per every one mole of nonchromogenic monofunctional alcohol, thiol, and/or amine, and in one embodiment no more than about 20 moles of anhydride repeat monomer units per every one mole of nonchromogenic monofunctional alcohol, thiol, and/or amine, in another embodiment no more than about 10 moles of anhydride repeat monomer units per every one mole of nonchromogenic monofunctional alcohol, thiol, and/or amine, in yet another embodiment no more than about 5 moles of anhydride repeat monomer units per every one mole of nonchromogenic monofunctional alcohol, thiol, and/or amine, and in still another embodiment no more than about 1.1 moles of anhydride repeat monomer units per every one mole of nonchromogenic monofunctional alcohol, thiol, and/or amine, although the relative amounts of nonchromogenic monofunctional alcohol, thiol, and/or amine and anhydride copolymer can be outside of these ranges.

The reaction between the nonchromogenic monofunctional alcohol, thiol, and/or amine and the anhydride copolymer can take place at any desired or effective temperature, in one embodiment at least about 25° C., in another embodiment at least about 40° C., and in yet another embodiment at least about 60° C., and in one embodiment no more than about 200° C., in another embodiment no more than about 160° C., and in yet another embodiment no more than about 120° C., although the temperature can be outside of these ranges.

The reaction between the nonchromogenic monofunctional alcohol, thiol, and/or amine and the anhydride copolymer can take place for any desired or effective period of time, in one embodiment at least about 15 minutes, in another embodiment at least about 12 hours, and in yet another embodiment at least about 2 days, and in one embodiment no more than about 100 hours, and in another embodiment no more than about 2 days, although the time can be outside of these ranges.

The reaction between the nonchromogenic monofunctional alcohol, thiol, and/or amine and the anhydride copolymer can be carried out neat in the absence of a solvent. Optionally, if desired, a solvent can be employed. Examples of suitable solvents include acetonitrile, methylene chloride, tetrahydrofuran, diethyl ether, diglyme, toluene, or the like, as well as mixtures thereof. When present, the optional solvent is present in any desired or effective amount, typically at least about 3 parts by weight solvent per every 1 part by weight reaction solids, and typically no more than about 10 parts by weight solvent per every 1 part by weight reaction solids, although the amount of solvent can be outside of these ranges.

The reaction between the nonchromogenic alcohol, thiol, and/or amine to place thereon an ester, amide, thioester, or imide group is believed to proceed as follows (illustrated for the instance wherein the chromogen is a monofunctional primary amine:

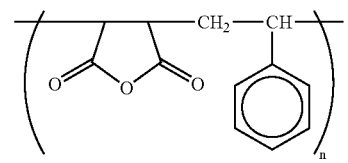

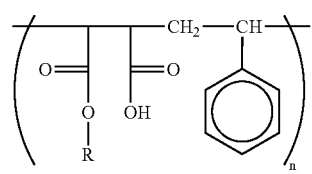

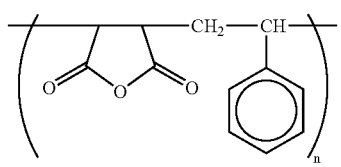

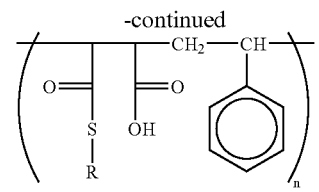

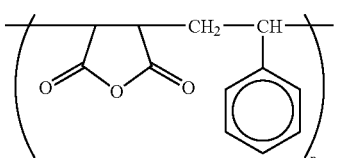

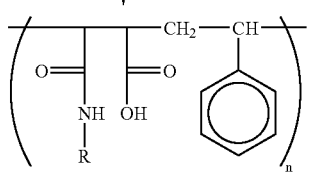

Optionally, the amic acid can be converted to an imide group as follows:

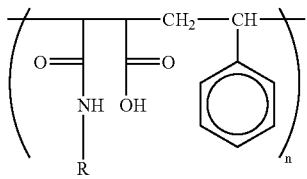

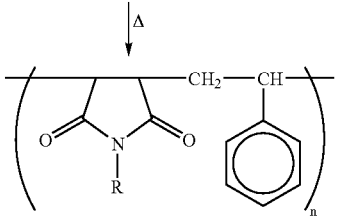

The chromogen and the nonchromogenic monofunctional alcohol, thiol, and/or amine can be reacted with the anhydride copolymer in a single step, with the reaction mixture comprising a mixture of the anhydride copolymer, chromogen, and nonchromogenic monofunctional alcohol, thiol, and/or amine. Alternatively, these reactions can be carried out in separate steps, in one step reacting the chromogen with the anhydride copolymer and in another step reacting the nonchromogenic monofunctional alcohol, thiol, and/or amine with the anhydride copolymer; in this embodiment the order of steps is not important, and either step can be carried out before or after the other.

In a specific embodiment the anhydride copolymer is also reacted with an antioxidant or UV stabilizer molecule having thereon (A) at least one isocyanate-reactive hydroxyl group and/or (B) at least one isocyanate-reactive primary or secondary amino group, thereby forming an anhydride copolymer having an antioxidant or UV stabilizer moiety covalently bonded thereto.

The antioxidant or UV stabilizer has thereon at least one isocyanate-reactive hydroxyl group and/or at least one isocyanate-reactive primary or secondary amino group. By "isocyanate reactive" is meant that the hydroxyl group or amino group is not incapable of reacting with an isocyanate compound by reason of steric hindrance, hydrogen bonding or other intramolecular forces, or any other reason that would prevent the hydroxyl group or amino group from reacting with an isocyanate.

One example of a class of suitable antioxidants and/or UV stabilizers is that of hydroxybenzophenones, including (but not limited to) those of the general formula

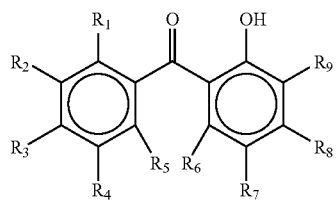

wherein, provided that at least one of $R_1$, $R_2$, $R_3$, $R_4$, $R_5$, $R_6$, $R_7$, $R_8$, and $R_9$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_1$, $R_2$, $R_3$, $R_4$, $R_5$, $R_6$, $R_7$, $R_8$, and $R_9$ each, independently of the others, is (i) a hydrogen atom, (ii) a hydroxy group, (iii) an amino group of the formula —$NR_{10}R_{11}$, wherein $R_{10}$ and $R_{11}$ each, independently of the others, is a hydrogen atom, an alkyl group as defined for $R_1$, $R_2$, $R_3$, $R_4$, $R_5$, $R_6$, $R_7$, $R_8$, and $R_9$, an aryl group as defined for $R_1$, $R_2$, $R_3$, $R_4$, $R_5$, $R_6$, $R_7$, $R_8$, and $R_9$, an arylalkyl group as defined for $R_1$, $R_2$, $R_3$, $R_4$, $R_5$, $R_6$, $R_7$, $R_8$, and $R_9$, or an alkylaryl group as defined for $R_1$, $R_2$, $R_3$, $R_4$, $R_5$, $R_6$, $R_7$, $R_8$, and $R_9$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon. atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable hydroxybenzophenones include 2,4-dihydroxybenzophenone, of the formula

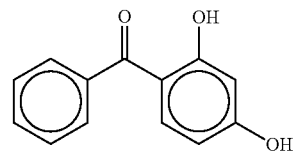

available from Aldrich Chemical Co., Milwaukee, Wis., 2,2', 4,4'-tetrahydroxybenzophenone, of the formula

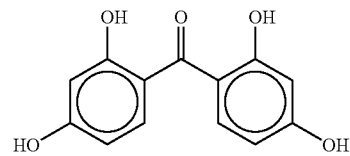

available from Aldrich Chemical Co., 2,4,4'-trihydroxybenzophenone, of the formula

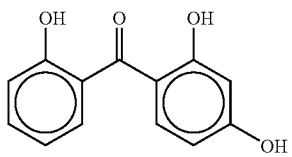

available from the Aldrich Chemical Co., and the like.

Another example of a class of suitable antioxidants and/or UV stabilizers is that of hydroxybenzotriazines, including (but not limited to) those of the formula

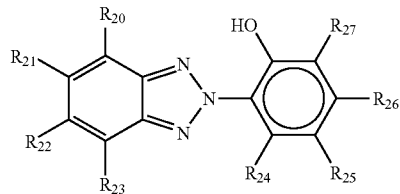

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group as defined for $R_{20}$, $R_{21}$, $R_{23}$, $R_{23}$, $R_{24}$, $R_{25}$, $R_{26}$, and $R_{27}$, an aryl group as defined for $R_{20}$, $R_{21}$, $R_{23}$, $R_{23}$, $R_{24}$, $R_{25}$, $R_{26}$, and $R_{27}$, an arylalkyl group as defined for $R_{20}$, $R_{21}$, $R_{23}$, $R_{23}$, $R_{24}$, $R_{25}$, $R_{26}$, and $R_{27}$, or an alkylaryl group as defined for $R_{20}$, $R_{21}$, $R_{23}$, $R_{23}$, $R_{24}$, $R_{25}$, $R_{26}$, and $R_{27}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20,21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) d polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable hydroxybenzotriazines include 3-(2H-benzotriazol-2-yl)-4-hydroxyphenethyl alcohol, of the formula

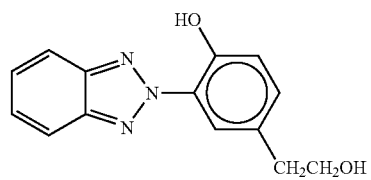

commercially available as NORBLOC 6000 from Normaco Inc., New Brunswick, N.J. and from Aldrich Chemical Co., Milwaukee, Wis., 2-(2H-benzotriazol-2-yl)-4-(1-hydroxyethyl) phenol, of the formula

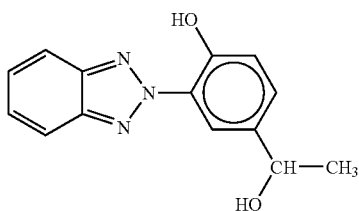

available as HPMC-BZ from Hoechst Celanese Corp., Charlotte, N.C., and the like.

Another example of a class of suitable antioxidant and/or UV stabilizer molecules is that of hindered amine light stabilizers, including (but not limited to) those of the formula

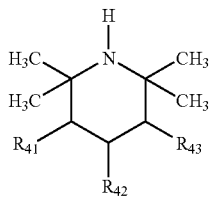

wherein, provided that at least one of $R_{41}$, $R_{42}$, and $R_{43}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{41}$, $R_{42}$, and $R_{43}$ each, independently of the others, is (i) a hydrogen atom, (ii) a hydroxy group, (iii) an amino group of the formula —$NR_{44}R_{45}$, wherein $R_{44}$ and $R_{45}$ each, independently of the others, is a hydrogen atom, an alkyl group as defined for $R_{41}$, $R_{42}$, and $R_{43}$, an aryl group as defined for $R_{41}$, $R_{42}$, and $R_{43}$, an arylalkyl group as defined for $R_{41}$, $R_{42}$, and $R_{43}$, or an alkylaryl group as defined for $R_{41}$, $R_{42}$, and $R_{43}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable hindered amine light stabilizers include 2,2,6,6-tetramethyl-4-piperidinol, of the formula

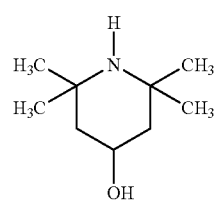

available from Hüls America, Piscataway, N.J., 7,7,9,9-tetramethyl-1,4-dioxa-8-azaspiro(4.5)decane-2-methanol, of the formula

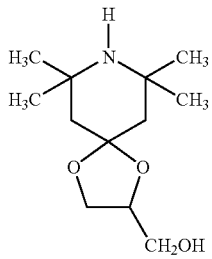

available from Aldrich Chemical Company, Milwaukee, Wis., 2,2,6,6-tetramethyl-4-piperidinamine, of the formula

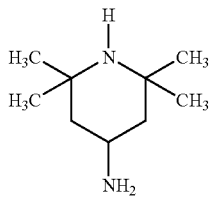

available from Hüls America, Piscataway, N.J., and the like.

Another example of a class of suitable antioxidants and/or UV stabilizers is that of butylated hydroxytoluenes, including (but not limited to) those of the formula

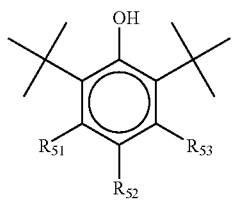

wherein, provided that at least one of $R_{51}$, $R_{52}$, and $R_{53}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{51}$, $R_{52}$, and $R_{53}$ each, independently of the others, is (i) a hydrogen atom, (ii) a hydroxy group, (iii) an amino group of the formula —$NR_{54}R_{55}$, wherein $R_{54}$ and $R_{55}$ each, independently of the others, is a hydrogen atom, an alkyl group as defined for $R_{51}$, $R_{52}$, and $R_{53}$, an aryl group as defined for $R_{51}$, $R_{52}$, and $R_{53}$, an arylalkyl group as defined for $R_{51}$, $R_{52}$, and $R_{53}$, or an alkylaryl group as defined for $R_{51}$, $R_{52}$, and $R_{53}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable butylated hydroxytoluenes include 2,6-di-tert-butyl-4-hydroxymethylphenol, of the formula

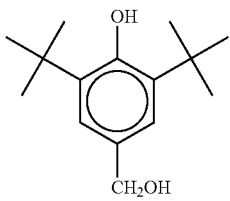

available from TCI America, Portland, Oreg., 3,5-di-tert-butyl-4-hydroxybenzoic acid, of the formula

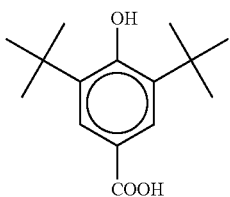

available from TCI America, Portland, Oreg., and the like.

Another example of a class of suitable antioxidants and/or UV stabilizers is that of diaromatic secondary amines, including (but not limited to) those of the formula

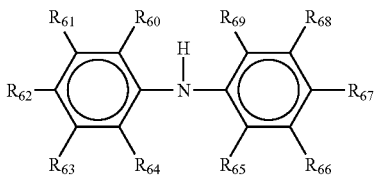

wherein, provided that at least one of $R_{60}$, $R_{61}$, $R_{62}$, $R_{63}$, $R_{64}$, $R_{65}$, $R_{66}$, $R_{67}$, $R_{68}$, and $R_{69}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{60}$, $R_{61}$, $R_{62}$, $R_{63}$, $R_{64}$, $R_{65}$, $R_{66}$, $R_{67}$, $R_{68}$, and $R_{69}$ each, independently of the others, is (i) a hydrogen atom, (ii) a hydroxy group, (iii) an amino group of the formula —$NR_{58}R_{59}$, wherein $R_{58}$ and $R_{59}$ each, independently of the others, is a hydrogen atom, an alkyl group as defined for $R_{60}$, $R_{61}$, $R_{62}$, $R_{63}$, $R_{64}$, $R_{65}$, $R_{66}$, $R_{67}$, $R_{68}$, and $R_{69}$, an aryl group as defined for $R_{60}$, $R_{61}$, $R_{62}$, $R_{63}$, $R_{64}$, $R_{65}$, $R_{66}$, $R_{67}$, $R_{68}$, and $R_{69}$, an arylalkyl group as defined for $R_{60}$, $R_{61}$, $R_{62}$, $R_{63}$, $R_{64}$, $R_{65}$, $R_{66}$, $R_{67}$, $R_{68}$, and $R_{69}$, or an alkylaryl group as defined for $R_{60}$, $R_{61}$, $R_{62}$, $R_{63}$, $R_{64}$, $R_{65}$, $R_{66}$, $R_{67}$, $R_{68}$, and $R_{69}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable diaromatic secondary amines include 4,4'-diaminophenylamine, of the formula

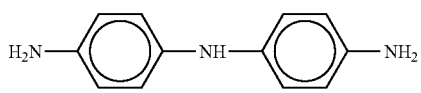

available from Aldrich Chemical Co., N-phenyl-1,4-phenylenediamine, of the formula

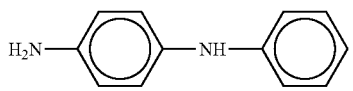

available from Aldrich Chemical Co., and the like.

Another example of a class of suitable antioxidants and/or UV stabilizers is that of diphenyl acrylonitrile esters, including (but not limited to) those of the formula

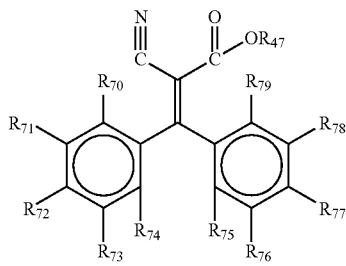

wherein, provided that at least one of $R_{47}$, $R_{70}$, $R_{71}$, $R_{72}$, $R_{73}$, $R_{74}$, $R_{75}$, $R_{76}$, $R_{77}$, $R_{78}$, and $R_{79}$, is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (i) a hydrogen atom, (ii) a hydroxy group, (iii) an amino group of the formula —$NR_{48}R_{49}$, wherein $R_{48}$ and $R_{49}$ each, independently of the others, is a hydrogen atom, an alkyl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, an aryl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, an arylalkyl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, or an alkylaryl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, and further wherein $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group. (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable diphenyl acrylonitrile esters include 3-phenyl-3-(p-hydroxyphenyl)-2-carboxyethyl-acrylonitrile, of the formula

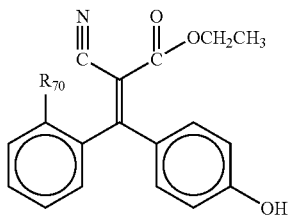

which can be prepared by any desired or effective method, such as by the Knoevenagel condensation of 4-hydroxybenzophenone with a cyanoacetate ester such as ethylcyanoacetate, as described in, for example, Jerry March, *Advanced Organic Chemistry*, 2$^{nd}$ Ed. 1977, p 854-859 (McGraw Hill Inc.), the disclosure of which is totally incorporated herein by reference, and the like.

Another example of a class of suitable antioxidants and/or UV stabilizers is that of cinnamates, including (but not limited to) those of the formula

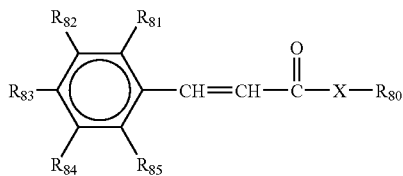

wherein, provided that at least one of $R_{80}$, $R_{81}$, $R_{82}$, $R_{83}$, $R_{84}$, and $R_{85}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, (a) X is (i) an oxygen atom, (ii) a sulfur atom, (iii) a group of the formula —$NR_{86}$—, wherein $R_{86}$ is an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, or (iv) a group of the formula —$CR_{87}R_{57}$—, wherein $R_{87}$ and $R_{57}$ each, independently of the others, is a hydrogen atom, an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, and (b) $R_{80}$, $R_{81}$, $R_{82}$, $R_{83}$, $R_{84}$, and $R_{85}$ each, independently of the others, is (i) a hydrogen atom, (ii) a hydroxy group, (iii) an amino group of the formula —$NR_{88}R_{89}$, wherein $R_{88}$ and $R_{89}$ each, independently of the others, is a hydrogen atom, an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable cinnamates include 4-methoxy cinnamic acid, of the formula

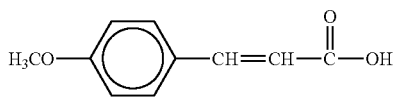

available from Aldrich Chemical Co., and the like.

Another example of a class of suitable antioxidants and/or UV stabilizers is that of trisaryl-1,3,5-triazines, including (but not limited to) those of the formula

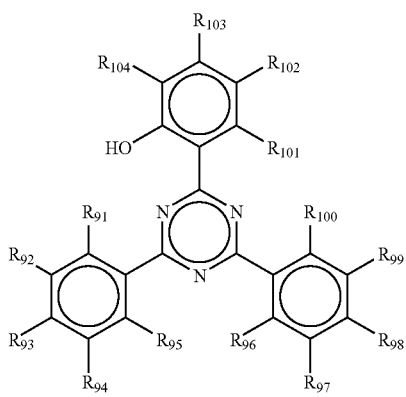

wherein, provided that at least one of $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, each, independently of the others, is (i) a hydrogen atom, (ii) a hydroxy group, (iii) an amino group of the formula —$NR_{105}R_{106}$, wherein $R_{105}$ and $R_{106}$ each, independently of the others, is a hydrogen atom, an alkyl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{102}$, $R_{103}$, and $R_{104}$, an aryl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, an arylalkyl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, or an alkylaryl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable trisaryl-1,3,5-triazines include TINUVIN® 405, of the formula

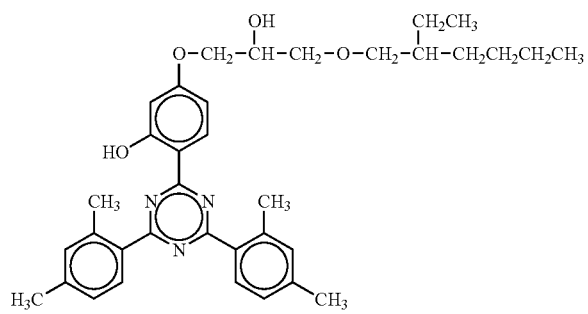

available from Ciba Specialty Chemicals, and the like.

Mixtures of two or more antioxidants and/or UV stabilizers can also be employed.

The antioxidant or UV stabilizer is present in any desired or effective amount, in one embodiment at least about 1.1 moles of anhydride repeat monomer units per every one mole of antioxidant or UV stabilizer molecule, in another embodiment at least about 2 moles of anhydride repeat monomer units per every one mole of antioxidant or UV stabilizer molecule, and in yet another embodiment at least about 3 moles of anhydride repeat monomer units per every one mole of antioxidant or UV stabilizer molecule, and in one embodiment no more than about 20 moles of anhydride repeat monomer units per every one mole of antioxidant or UV stabilizer molecule, in another embodiment no more than about 10 moles of anhydride repeat monomer units per every one mole of antioxidant or UV stabilizer molecule, in yet another embodiment no more than about 5 moles of anhydride repeat monomer units per every one mole of antioxidant or UV stabilizer molecule, and in still another embodiment no more than about 1.1 moles of anhydride repeat monomer units per every one mole of antioxidant or UV stabilizer molecule, although the relative amounts of antioxidant or UV stabilizer molecule and anhydride copolymer can be outside of these ranges.

The reaction between the antioxidant or UV stabilizer and the anhydride copolymer can take place at any desired or effective temperature, in one embodiment at least about 25° C., in another embodiment at least about 40° C., and in yet another embodiment at least about 60° C., and in one embodiment no more than about 200° C., in another embodiment no more than about 160° C., and in yet another embodiment no more than about 120° C., although the temperature can be outside of these ranges.

The reaction between the antioxidant or UV stabilizer and the anhydride copolymer can take place for any desired or effective period of time, in one embodiment at least about 15 minutes, in another embodiment at least about 12 hours, and in yet another embodiment at least about 2 days, and in one embodiment no more than about 100 hours, and in another embodiment no more than about 2 days, although the time can be outside of these ranges.

The reaction between the antioxidant or UV stabilizer and the anhydride copolymer can be carried out neat in the absence of a solvent. Optionally, if desired, a solvent can be employed. Examples of suitable solvents include acetonitrile, methylene chloride, tetrahydrofuran, diethyl ether, diglyme, toluene, or the like, as well as mixtures thereof. When present the optional solvent is present in any desired or effective amount typically at least about 3 parts by weight solvent per every 1 part by weight reaction solids, and typically no more than about 10 parts by weight solvent per every 1 part by weight reaction solids, although the amount of solvent can be outside of these ranges.

The reaction between the antioxidant or UV stabilizer to place thereon an antioxidant or UV stabilizer is believed to proceed as follows (illustrated for the instance wherein the antioxidant or UV stabilizer is a monofunctional primary amine):

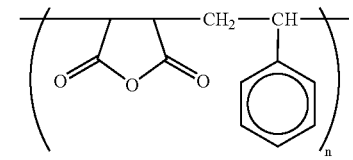

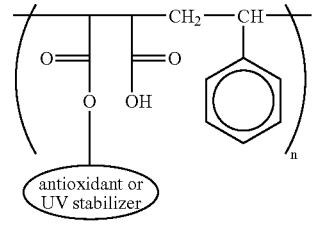

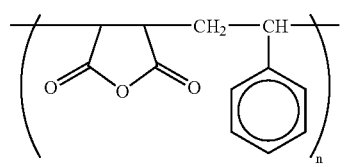

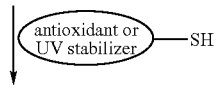

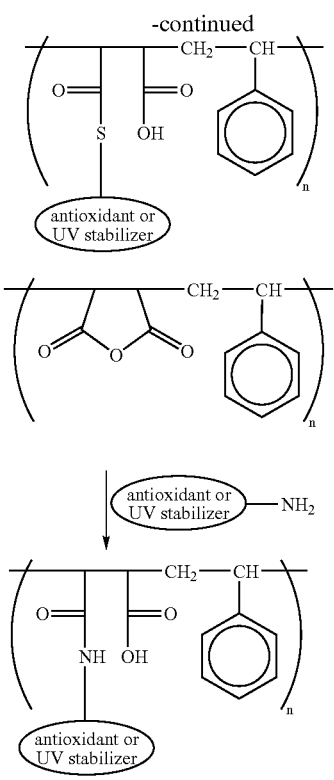

Optionally, the amic acid can be converted to an imide group as follows:

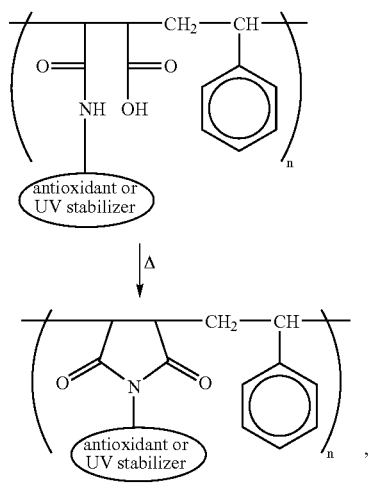

The chromogen, the nonchromogenic monofunctional alcohol, thiol, and/or amine, and the antioxidant or UV stabilizer can be reacted with the anhydride copolymer in a single step, with the reaction mixture comprising a mixture of the anhydride copolymer, chromogen, nonchromogenic monofunctional alcohol, thiol, and/or amine, and antioxidant or UV stabilizer. Alternatively, these reactions can be carried out in separate steps, in one step reacting the chromogen with the anhydride copolymer and in other steps reacting the nonchromogenic monofunctional alcohol, thiol, and/or amine with the anhydride copolymer and reacting the antioxidant or UV stabilizer with the anhydride copolymer; in this embodiment the order of steps is not important and either step can be carried out before or after the other.

The colored maleic anhydride copolymer is soluble or dispersible in the aqueous liquid vehicle. By "soluble" is meant that the polymer blends uniformly with the aqueous liquid vehicle and is molecularly or ionically dispersed in the aqueous liquid vehicle. By "dispersible" is meant that the polymer and the aqueous liquid vehicle form a two-phase system wherein one phase, comprising the polymer, forms finely divided particles or domains in the other phase, comprising the aqueous liquid vehicle; in a specific embodiment, the particles or domains of polymer within the aqueous liquid vehicle have an average particle diameter of no more than about 1 micron, although the domain or particle size can be outside of this range.

The colored maleic anhydride copolymer is present in the inks in any desired or effective amount in one embodiment at least about 1 percent by weight of the ink, in another embodiment at least about 5 percent by weight of the ink, and in yet another embodiment at least about 10 percent by weight of the ink, and in one embodiment no more than about 99 percent by weight of the ink, in another embodiment no more than about 50 percent by weight of the ink, and in yet another embodiment no more than about 20 percent by weight of the ink, although the amount can be outside of these ranges.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the ink compositions are generally of a viscosity suitable for use in said ink jet printing processes. For example, for thermal ink jet printing applications, at room temperature (i.e., about 25° C.), typically, the ink viscosity is typically at least about 1 centipoise and typically is no more than about 10 centipoise, preferably no more than about 7 centipoise, and more preferably no more than about 5 centipoise, although the viscosity can be outside of these ranges, particularly when the ink is used for applications such as acoustic ink jet printing. When used in marking pen applications, the ink compositions are generally of a viscosity suitable for use in said applications.

The ink compositions can be of any suitable or desired pH. For some embodiments, such as thermal ink jet printing processes, typical pH values are at least about 2, preferably at least about 3, and more preferably at least about 5, and typically up to about 11, preferably up to about 10, and more preferably up to about 9, although the pH can be outside of these ranges.

The ink compositions can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

Also disclosed herein is a process which comprises applying an ink composition as disclosed herein to a substrate in an imagewise pattern. In a specific embodiment the ink is applied to the substrate by incorporating the ink composition into a marking pen and causing marks to be made on the substrate in an imagewise pattern with the marking pen.

The ink compositions can be used in a process which entails incorporating the ink composition into an ink jet printing apparatus and causing droplets of the ink composition to be ejected in an imagewise pattern onto a substrate. In a particularly preferred embodiment the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Phase Separation of N-Ethyl Aniline Ethoxylate

To a 100 milliliter beaker equipped with a magnetic stirrer was added about 50 milliliters of POE(10) N-ethyl aniline, of the formula

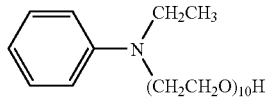

(obtained from Henkel Corp, Mauldin, S.C.) and about 65 milliliters of deionized water. The mixture was placed on a magnetic stirring hot plate and stirring and heating were initiated. When the temperature reached 90° C., the beaker was removed from heat and stirring and was allowed to cool slowly. After several minutes, separation of layers began to occur, and after about 2 hours, the temperature had returned to room temperature and the separation was complete. A separation of the two layers was visually observed, and separation of the layers was performed with a separatory funnel.

Colorant Preparation

To a 500 milliliter 3-necked kettle equipped with a thermometer, Trubore stirrer, and constant pressure addition funnel was added about 115 grams of 85 percent $H_3PO_4$ obtained from Olin Corp., Norwalk, Conn.) in water, about 31 grams of 95 percent $H_2SO_4$ (obtained from Olin Corp., Norwalk, Conn.) in water, and 2 drops of 2-ethylhexanol (obtained from Aldrich Chemical Co., Milwaukee, Wis.). Stirring was then initiated and the kettle was placed in a salt/ice bath to cool the mixture to about 0° C. Once 0° C. was reached, 10.2 grams of 2-amino-4-methylbenzothiazole (obtained from Aldrich Chemical Co.) was added with stirring and the temperature was maintained at 0° C. To the constant pressure addition funnel was then added about 21.7 grams of nitrosyl sulfuric acid (obtained from Aldrich Chemical Co.) in a dropwise fashion, maintaining the temperature at about 0° C., over a period of about 1.5 hours. The reaction mixture was subsequently maintained at 0° C. with stirring for an additional 1.5 hours to ensure complete diazotization. Thereafter, about 0.7 gram of sulfamic acid (obtained from Aldrich Chemical Co.) was added with stirring to neutralize any excess NO+. The diazo mixture was then slowly added over about 0.75 hour to a 1 liter beaker equipped with a stir magnet in a 5° C. ice bath, the beaker containing about 36.0 grams of the POE(10) N-ethyl aniline purified as indicated above, 150 milliliters of deionized water, and about 2.0 grams of urea (obtained from Aldrich Chemical Co.). The diazo colorant was allowed to stir cool for about 2 hours, followed by stirring at room temperature overnight. The diazo colorant was then neutralized to a pH of about 7 with a 50 percent aqueous solution of sodium hydroxide (solid material obtained from Aldrich Chemical Co.), keeping the temperature below about 60° C. Following neutralization, the colorant was poured into a 1 liter separatory funnel and allowed to phase separate. The bottom salt/water layer was discarded and the liquid colored product layer was dissolved in methylene chloride (obtained from Aldrich Chemical Co.) and run through a small "plug" of silica gel (70-230 mesh, for column chromatography, obtained from Aldrich Chemical Co.) to remove any polar impurities. The methylene chloride layer was then collected and the methylene chloride removed via rotary evaporation, yielding a viscous red liquid. The resulting colorant is expected to have an absorption maxima consistent with the following structure:

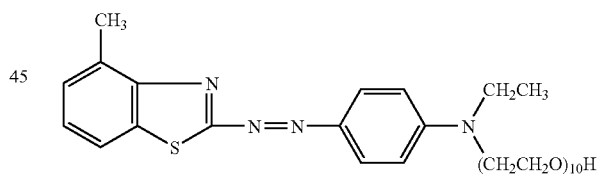

EXAMPLE II

To a 500 milliliter 3-necked kettle equipped with a thermometer, Trubore stirrer, and constant pressure addition funnel was added about 27.0 grams of deionized water, about 20 grams of 95 percent $H_2SO_4$ (obtained from Olin Corp., Norwalk, Conn.) in water, and 2 drops of 2-ethylhexanol (obtained from Aldrich Chemical Co., Milwaukee, Wis.). Stirring was then initiated and the kettle was placed in a salt/ice bath to cool the mixture to about 0° C. Once 0° C. was reached, 10.3 grams of 2-chloro-4-(methylsulfone) aniline (CAMSU, obtained from Clariant Corp., Charlotte, N.C.) was added with stirring and the temperature was maintained at 0° C. To the constant pressure addition funnel was then added about 21.0 grams of nitrosyl sulfuric acid (obtained from Aldrich Chemical Co.) in a dropwise fashion, maintaining the temperature at about 0° C., over a period of about 1.5 hours. The reaction mixture was subsequently maintained at 0° C. with stirring for an additional 1.5 hours to ensure complete diazotization. Thereafter, about 1.0 gram of sulfamic acid (obtained from Aldrich Chemical Co.) was added with stirring to neutralize any excess NO+. The diazo mixture was then slowly added over about 0.75 hour to a 1 liter beaker equipped with a stir magnet in a 5° C. ice bath, the beaker containing about 29.1 grams of the POE(10) N-ethyl aniline purified as indicated in Example I, 150 milliliters of deionized water, and about 2.0 grams of urea (obtained from Aldrich Chemical Co.). The diazo colorant was allowed to stir cool for about 2 hours, followed by stirring at room temperature overnight. The diazo colorant was then neutralized to a pH of about 7 with a 50 percent aqueous solution of sodium hydroxide (solid material obtained from Aldrich Chemical Co.), keeping the temperature below about 60° C. Following neutralization, the colorant was poured into a 1 liter separatory funnel and allowed to phase separate. The bottom salt/water layer was discarded and the liquid colored product layer was dissolved in methylene chloride (obtained from Aldrich Chemical Co.) and run through a small "plug" of silica gel (70-230 mesh, for column chromatography, obtained from Aldrich Chemical Co.) to remove any polar impurities. The methylene chloride layer was then collected and the methylene chloride removed via rotary evaporation, yielding a viscous orange liquid. The resulting colorant was consistent with the following formula:

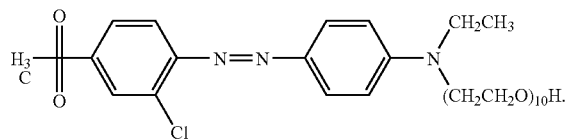

EXAMPLE III

The process of Example I is repeated except that a random POE (3.5) POP (6.5) N-ethyl aniline, of the formula

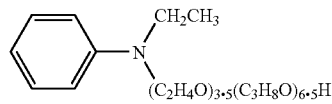

wherein 3.5 represents the average number of repeat polyoxyethylene units per molecule and 6.5 represents the average number of repeat polyoxypropylene units per molecule, and wherein the polyoxyethylene and polyoxypropylene units are randomly mixed within the polyoxyalkylene chain (available as SO-7864 from Henkel Corp., Mauldin, S.C.) is substituted for the POE(10) N-ethyl aniline it is believed that a colorant consistent with the formula

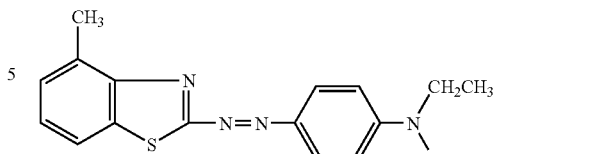

will be obtained.

EXAMPLE IV

The process of Example II is repeated except that a random POE (3.5) POP (6.5) N-ethyl aniline, of the formula

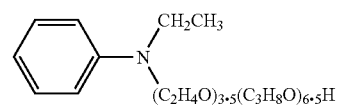

wherein 3.5 represents the average number of repeat polyoxyethylene units per molecule and 6.5 represents the average number of repeat polyoxypropylene units per molecule, and wherein the polyoxyethylene and polyoxypropylene units are randomly mixed within the polyoxyalkylene chain (available as SO-7864 from Henkel Corp., Mauldin, S.C.) is substituted for the POE(10) N-ethyl aniline. It is believed that a colorant of the formula

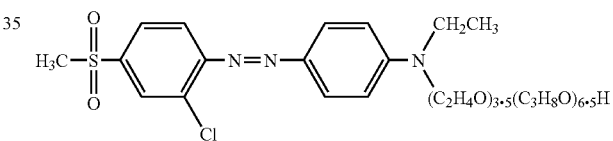

will be obtained.

EXAMPLE V

Reaction Product of Styrene-Maleic Anhydride Polymer with NEODOL 1-3 and Red Azo Monohydroxyl Polyoxyalkylene Colorant To a 500 milliliter three-neck kettle equipped with a TEFLON® coated magnet oil bath, and condenser was added 14.0 grams (0.068 equivalents) of styrene-maleic anhydride polymer (SMA 1000, obtained from Atochem Inc., Malvern, Pa.), 15.9 grams (0.052 equivalents) of an alcohol of the formula $C_{11}H_{22}$—O—$(CH_2CH_2O)_n$H wherein n has an average value of 3 (NEODOL 1-3, obtained from Shell Chemical Company, Houston, Tex.), 12.7 grams (0.017 equivalents) of the red azo monohydroxyl polyoxyalkylene colorant prepared in Example I, about 250 grams of acetonitrile (obtained from Aldrich Chemical Co., Milwaukee, Wis.), and 2 drops of 1-methylimidazole catalyst (obtained from Aldrich Chemical Co.). The reaction mixture was heated with stirring to reflux and held at that state for 2 days. After 2 days, the acetonitrile was removed by distillation. The red viscous colored product still in the flask was then placed in a vacuum oven to remove any residue of acetonitrile. The final red viscous material had a $T_g$ of −38° C.

EXAMPLE VI

Reaction Product of Styrene-Maleic Anhydride Polymer with Red Azo Monohydroxyl Polyoxyalkylene Colorant and Tripropylene Glycol Monomethyl Ether To a 500 milliliter 3-neck kettle equipped with reflux condenser, thermocouple temperature controller, and magnetic stirrer was added 252 milliliters of acetonitrile (obtained from Aldrich Chemical Co., Milwaukee, Wis.), 29.0 grams of styrene-maleic anhydride copolymer (SMA 1000, obtained from ATOCHEM North America, Inc., King of Prussia, Pa.), 25.7 grams of tripropylene glycol monomethyl ether (obtained from Aldrich Chemical Co.), and 4.6 grams of the red azo monohydroxyl polyoxyalkylene colorant prepared in Example I (quantitatively transferred with a small amount of acetonitrile). The reaction mixture was heated to reflux, about 10 drops of 1-methylimidazole (obtained from Aldrich Chemical Co.) was added, and reflux was continued for 48 hours. The acetonitrile was then distilled off, yielding a red, highly viscous liquid.

EXAMPLE VII 8 milligrams of the colorant prepared in Example VI were brought into 35 milliliters of concentrated ammonia solution (about 30. mole percent; obtained from J. T. Baker). The mixture was agitated until all of the dye was dissolved and a dark red liquid solution had formed.

Using a pipette, 2 milliliters of the solution were distributed in three thin equally spaced strips on the etched patterns in the surface platen of a K-proofer (RK Priny-Coat Instruments Ltd., UK) at room temperature. Thereafter, appropriately cut Hammermill paper was affixed on the rubber roller of the K-proofer, and then brought into contact with the surface of the metal platen. Using a speed of 1 inch per second, the paper was evenly rolled behind a doctor blade over the platen with the colorant. Afterwards, the roller was raised from the platen, and the paper removed from the roller. Three distinct rectangular patterns of magenta coloration with different dye concentration were printed on the surface of the paper.

EXAMPLE VIII

To a 100 milliliter beaker equipped with magnetic stir was added about 8 grams of the red material prepared as described in Example VI and 35 milliliters of concentrated ammonia solution. Stirring was continued until all the solid material dissolved. About 2 milliliters of this aqueous solution was placed on the platen of a K-proofer and prints were made. The prints were allowed to dry and tested for washfastness. No bleeding of color was observed.

EXAMPLE IX

Phase Separation of N-Ethyl Aniline Ethoxylate

POE(10) N-ethyl aniline, of the formula

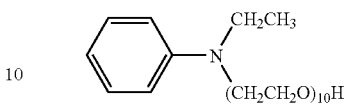

(obtained from Henkel Corp, Mauldin, S.C.) is phase separated as described in Example I.

Acetylation/Protection

To a 1,000 milliliter flask equipped with a vacuum adapter and magnetic stirrer was added about 400.0 grams of POE (10) N-ethyl aniline. The flask was placed in a 140° C. oil bath under vacuum with stirring for about 1 hour. The vacuum source was then removed and about 88.3 milliliters of acetic anhydride (obtained from Aldrich Chemical Co., Milwaukee, Wis.) and 10 drops of 1-methylimidazole (obtained from Aldrich Chemical Co.) were added to the flask. A nitrogen atmosphere and reflux condenser were then introduced, and the mixture was allowed to heat at 140 to 150° C. for about 4 hours. Thereafter, the condenser and nitrogen atmosphere were removed and a vacuum was gradually applied with the temperature at about 1 30° C. to remove excess acetic anhydride and acetic acid (generated as a reaction byproduct). Infrared spectroscopy showed that the OH band (3200-3600 $cm^{-1}$) in the POE(10) N-ethyl aniline had disappeared in the product, and a carbonyl band (1720-1770 $cm^{-1}$) had appeared in the product, indicating the success of the acetylation reaction.

Formylation

The acetylated product thus formed was transferred to a 1,000 milliliter 4-necked flask equipped with a Trubore stirrer, constant pressure addition funnel, nitrogen atmosphere, and thermometer. About 128.0 grams of dimethyl formamide (obtained from Aldrich Chemical Co.) was added to the acetylated product, stirring was initiated, and the mixture was cooled to about 0° C. About 160.0 grams of $POCl_3$ (obtained from Aldrich Chemical Co.) were added to the addition funnel and added dropwise to the reaction mixture at a rate to keep the temperature below 5° C. (about 5 hours). The reaction mixture was then stirred for 1 additional hour at 5° C., set at room temperature overnight and then heated to 80° C. for about 2 hours. Thereafter, about 500 grams of 50 percent sodium hydroxide (solid material obtained from Aldrich Chemical Co.) in water was added slowly at a rate to keep the temperature below 80° C. Upon addition of all of the sodium hydroxide solution, the mixture was poured into a 1,000 milliliter separatory funnel and allowed to phase separate. The bottom layer (comprising salt and water) was then drained and discarded.

Deacetylation/Deprotection

The acetylated and formylated product thus formed was then transferred back into a 1,000 milliliter 4-necked flask equipped with a Trubore stirrer, nitrogen atmosphere, and thermocouple temperature controller. About 280 grams of 50 percent sodium hydroxide (obtained from Aldrich Chemical Co.) in water and about 90 grams of 50 percent potassium hydroxide in water (solid material obtained from Aldrich Chemical Co.) were added, and the reaction mixture was heated to 100° C. and maintained at that temperature for about 3 hours. Thereafter, about 72 grams of 50 percent potassium hydroxide (obtained from Aldrich Chemical Co.) in water and 600 grams of deionized water were added, and heating was continued at 100° C. for an additional hour. The product mixture was then poured into a 2,000 milliliter separatory funnel and allowed to phase separate overnight. The water/salt layer was then removed, yielding the formylated hydroxy-terminated product of the formula

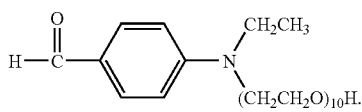

EXAMPLE X

Acetylation/Protection

To a 1,000 milliliter flask equipped with a vacuum adapter and magnetic stirrer was added about 200.0 grams of a random POE (3.5) POP (6.5) N-ethyl aniline, of the formula

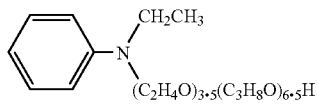

wherein 3.5 represents the average number of repeat polyoxyethylene units per molecule and 6.5 represents the average number of repeat polyoxypropylene units per molecule, and wherein the polyoxyethylene and polyoxypropylene units are randomly mixed within the polyoxyalkylene chain (obtained as SO-7864 from Henkel Corp., Mauldin, S.C.). The flask was placed in a 140° C. oil bath under vacuum with stirring for about 1 hour. The vacuum source was then removed and about 36.5 grams of acetic anhydride (obtained from Aldrich Chemical Co., Milwaukee, Wis.) and 10 drops of 1-methylimidazole (obtained from Aldrich Chemical Co.) were added to the flask. A nitrogen atmosphere and reflux condenser were then introduced, and the mixture was allowed to heat at 130 to 135° C. for about 3 hours. Thereafter, a vacuum was gradually applied with the temperature at about 130° C. to remove excess acetic acid (generated as a reaction byproduct) and acetic anhydride. Infrared spectroscopy showed that the OH band (3200-3600 cm$^{-1}$) in the POE/POP N-ethyl aniline had disappeared in the product, and a carbonyl band (1720-1770 cm$^{-1}$) had appeared in the product, indicating the success of the acetylation reaction.

Formylation

About 195.0 grams of the acetylated product thus formed was transferred to a 1,000 milliliter 4-necked flask equipped with a Trubore stirrer, constant pressure addition funnel, nitrogen atmosphere, and thermometer. About 51.0 grams of dimethyl formamide (obtained from Aldrich Chemical Co.) was added to the acetylated product, stirring was initiated, and the mixture was cooled to about 0° C. About 63.8 grams of POCl$_3$ (obtained from Aldrich Chemical Co.) were added to the addition funnel and added dropwise to the reaction mixture at a rate to keep the temperature below 5° C. (about 3 hours). The reaction mixture was then stirred for 0.5 additional hour at 5° C., set at room temperature overnight, and then heated to 80° C. for about 2 hours. Thereafter, about 275 grams of deionized water was added and enough 50 percent sodium hydroxide solution in water (solid sodium hydroxide obtained from Aldrich Chemical Co.) was added slowly at a rate to keep the temperature below 80° C. Upon addition of all of the sodium hydroxide solution, the mixture was poured into a 1,000 milliliter separatory funnel and allowed to phase separate. The bottom layer (comprising salt and water) was then drained and discarded.

Deacetylation/Deprotection

The acetylated and formylated product thus formed was then transferred back into a 1,000 milliliter 4-necked flask equipped with a TEFLON® coated magnet on a stirring hot plate. About 70 grams of sodium hydroxide and 23 grams of potassium hydroxide (obtained from Aldrich Chemical Co.) was dissolved in 400 milliliters of deionized water, and the reaction mixture was heated to 100° C. and maintained at that temperature for about 2 hours. The product mixture was then poured into a 2,000 milliliter separatory funnel and allowed to phase separate overnight. The water/salt layer was then removed. The product layer was transferred to a 2 liter beaker, 400 grams of deionized water were added, and the mixture was neutralized to a pH of about 7 with sulfuric acid (obtained from Aldrich Chemical Co.). The mixture was then heated to about 70° C. and transferred back to the separatory funnel and allowed to separate overnight. The water/salt layer was discarded, yielding the formylated hydroxy-terminated product of the formula

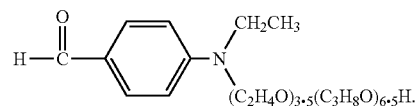

The product was stripped of any remaining residual water on a rotary evaporator. Infrared spectroscopy showed that the OH band (3200-3600 cm$^{-1}$) in the POE(3.5) POP (6.5) N-ethyl aniline was again present in the product, and a carbonyl band (1720-1770 cm$^{-1}$) of the formyl group was present in the product.

EXAMPLE XI

Monohydroxyl Methine Polyoxyalkylene Red/Magenta Colorant

To a 100 milliliter 1-necked round bottom flask equipped with a magnetic stirrer was added 20.0 grams (about 0.029 moles) of the para-formylated POE(3.5) POP(6.5) N-ethyl aniline adduct prepared in Example X, 5.2 grams of N-ethyl-1,2-dihydro-6-hydroxy-4-methyl-2-oxo-3-pyridine carbonitrile (obtained from Aldrich Chemical Co.), and a catalytic amount of ammonium acetate (obtained from Aldrich Chemical Co.). The flask was placed into a 100° C. oil bath, stirring was commenced, and the mixture was allowed to heat/stir for about 3 hours. After about 3 hours, the flask was removed from the heat and the red/magenta liquid product was allowed to cool to room temperature. The product at this point was a viscous red/magenta liquid consistent with the formula

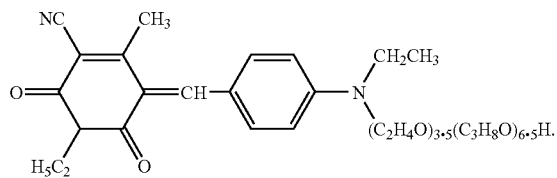

EXAMPLE XII

The process of Example XI is repeated except that the formylated hydroxy-terminated product prepared as described in Example IX is used instead of the formylated hydroxy-terminated product prepared as described in Example X. It is believed that the resulting product will have a structure similar to that of the colorant of Example XI except that the product will be consistent with the formula

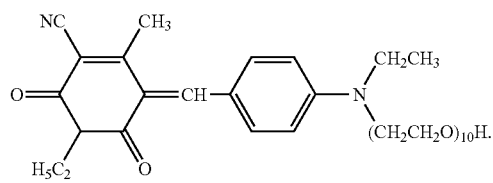

EXAMPLE XIII

Reaction Product of Styrene-Maleic Anhydride Polymer with NEODOL 1-3 and Magenta Methine Monohydroxyl Polyoxyalkylene Colorant To a 500 milliliter three-neck kettle equipped with a TEFLON® coated magnet, oil bath, and condenser is added 14.0 grams (0.068 equivalents) of styrene-maleic anhydride polymer (SMA 1000, available from Atochem Inc., Malvern, Pa.), 15.9 grams (0.052 equivalents) of an alcohol of the formula $C_{11}H_{22}$—O—$(CH_2CH_2O)_nH$ wherein n has an average value of 3 (NEODOL 1-3, available from Shell Chemical Company, Houston, Tex.), 14.3 grams (0.017 equivalents) of a magenta monohydroxyl polyoxyalkylene colorant prepared as described in Example XI, about 250 grams of acetonitrile (available from Aldrich Chemical Co., Milwaukee, Wis.), and 2 drops of 1-methylimidazole catalyst (available from Aldrich Chemical Co.). The reaction mixture is heated with stirring to reflux and held at that state for 2 days. After 2 days, the acetonitrile is removed by distillation. The magenta viscous colored product still in the flask is then placed in a vacuum oven to remove any residue of acetonitrile.

EXAMPLE XIV

To a 100 milliliter beaker equipped with magnetic stir was added about 8 grams of the magenta material prepared as described in Example XIII and 35 milliliters of concentrated ammonia solution. Stirring was continued until all the solid material dissolved. About 2 milliliters of this aqueous solution was placed on the platen of a K-proofer and prints were made. The prints were allowed to dry and tested for washfastness. No bleeding of color was observed.

EXAMPLE XV

Monohydroxyl Triphenylmethane Polyoxyalkylene TPM Violet Colorant

To a 100 milliliter 1-necked round bottom flask equipped with a magnetic stirrer was added 20.0 grams (about 0.029 moles) of the para-formylated POE(3.5) POP(6.5) N-ethyl aniline adduct prepared in Example X, 8.85 grams of N,N-diethylaniline (obtained from Aldrich Chemical Co.), 0.6 grams of urea (obtained from Aldrich Chemical Co.), and 1.5 grams of concentrated $H_2SO_4$ (obtained from Aldrich Chemical Co.). The flask was placed into a 100° C. oil bath, stirring was commenced, and the mixture was allowed to heat/stir for 3 hours. After 3 hours, 3.1 grams of benzoquinone (obtained from Aldrich Chemical Co.) and 2.0 grams of water were added to the reaction mixture and stirring/heating was continued for 2 hours, at which time the flask was removed from the heat and the violet liquid product was allowed to cool to room temperature. The product at this point was a viscous violet liquid consistent with the formula

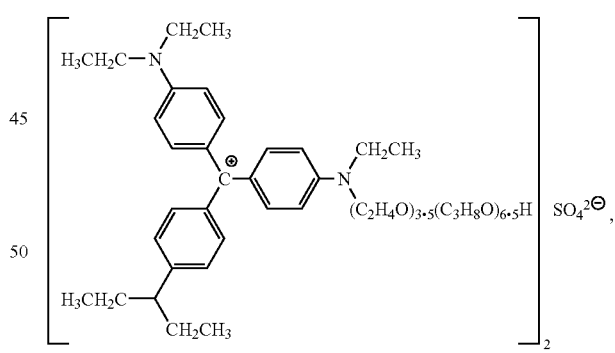

EXAMPLE XVI

The process of Example XV is repeated except that the formylated hydroxy-terminated product prepared as described in Example IX is used instead of the formylated hydroxy-terminated product prepared as described in Example X. It is believed that the resulting product will have a structure similar to that of the colorant of Example XV except that the product will be of the formula

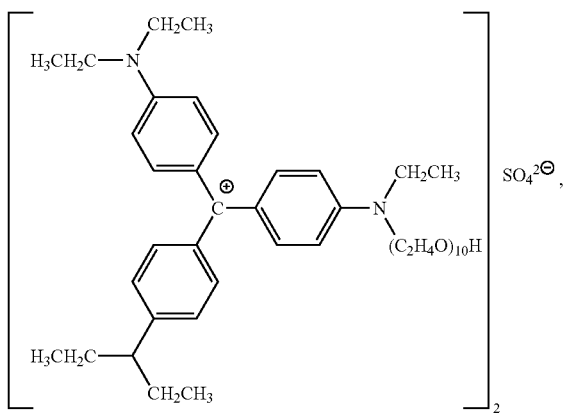

EXAMPLE XVII

Reaction Product of Styrene-Maleic Anhydride Polymer with NEODOL 1-3 and Violet TPM Monohydroxyl Polyoxyalkylene Colorant To a 500 milliliter three-neck kettle equipped with a TEFLON® coated magnet, oil bath, and condenser is added 14.0 grams (0.068 equivalents) of styrene-maleic anhydride polymer (SMA 1000, available from Atochem Inc., Malvern, Pa.), 15.9 grams (0.052 equivalents) of an alcohol of the formula $C_{11}H_{22}$—O—$(CH_2CH_2O)_n$H wherein n has an average value of 3 (NEODOL 1-3, available from Shell Chemical Company, Houston, Tex.), 0.017 equivalents of a violet monohydroxyl polyoxyalkylene colorant prepared as described in Example XV, about 250 grams of acetonitrile (available from Aldrich Chemical Co., Milwaukee, Wis.), and 2 drops of 1-methylimidazole catalyst (available from Aldrich Chemical Co.). The reaction mixture is heated with stirring to reflux and held at that state for 2 days. After 2 days, the acetonitrile is removed by distillation. The violet viscous colored product still in the flask is then placed in a vacuum oven to remove any residue of acetonitrile.

EXAMPLE XVIII

To a 100 milliliter beaker equipped with magnetic stir was added about 8 grams of the violet material prepared as described in Example XVII and 35 milliliters of concentrated ammonia solution. Stirring was continued until all the solid material dissolved. About 2 milliliters of this aqueous solution was placed on the platen of a K-proofer and prints were made. The prints were allowed to dry and tested for washfastness. No bleeding of color was observed.

EXAMPLE XIX

To a 500 milliliter three-neck kettle equipped with a TEFLON® coated magnet, oil bath, and condenser is added 14.0 grams (0.068 equivalents) of styrene-maleic anhydride polymer (SMA 1000, available from Atochem Inc., Malvern, Pa.), 15.9 grams (0.052 equivalents) of an alcohol of the formula $C_{11}H_{22}$—O—$(CH_2CH_2O)_n$H wherein n has an average value of 3 (NEODOL 1-3, available from Shell Chemical Company, Houston, Tex.), 0.017 equivalents of Disperse Red 13 (C.I. 11115), about 250 grams of acetonitrile (available from Aldrich Chemical Co., Milwaukee, Wis.), and 2 drops of 1-methylimidazole catalyst (available from Aldrich Chemical Co.). The reaction mixture is heated with stirring to reflux and held at that state for 2 days. After 2 days, the acetonitrile is removed by distillation. The colored anhydride polymer product still in the flask is then placed in a vacuum oven to remove any residue of acetonitrile.

This process is repeated several times using Disperse Blue 34 (C.I. 61510), Disperse Red 156 (C.I. 11235), Disperse Red 90 (C.I. 11343), Disperse Blue 85 (C.I. 11370), Disperse Blue 8 (C.I. 60742), Disperse Red 91 (C.I. 60753), Disperse Red 55 (C.I. 60757), Disperse Red 1 (C.I. 11110), Disperse Blue 3 (C.I. 61505), Basic Blue 41 (C.I. 11105), Disperse Red 8 (C.I. 11113), Disperse Red 98 (C.I. 11191), Disperse Red 109 (C.I. 11192), and Disperse Red 97 (C.I. 11232) instead of Disperse Red 13.

EXAMPLE XX

To a 500 milliliter 3-neck kettle equipped with reflux condenser, thermocouple temperature controller, and magnetic stirrer is added 252 milliliters of acetonitrile (available from Aldrich Chemical Co., Milwaukee, Wis.), 29.0 grams of styrene-maleic anhydride copolymer (SMA 1000, available from ATOCHEM North America, Inc., King of Prussia, Pa.), 25.7 grams of tripropylene glycol monomethyl ether (available from Aldrich Chemical Co.), and 2.2 grams of Disperse Red 13 (C.I. 11115). The reaction mixture is heated to reflux, about 10 drops of 1-methylimidazole (available from Aldrich Chemical Co.) is added, and reflux is continued for 48 hours. The acetonitrile is then distilled off, yielding a highly viscous liquid containing the colored anhydride polymer.

This process is repeated several times using Disperse Blue 34 (C.I. 61510), Disperse Red 156 (C.I. 11235), Disperse Red 90 (C.I. 11343), Disperse Blue 85 (C.I. 11370), Disperse Blue 8 (C.I. 60742), Disperse Red 91 (C.I. 60753), Disperse Red 55 (C.I. 60757), Disperse Red 1 (C.I. 11110), Disperse Blue 3 (C.I. 61505), Basic Blue 41 (C.I. 11105), Disperse Red 8 (C.I. 11113), Disperse Red 98 (C.I. 11191), Disperse Red 109 (C.I. 11192), and Disperse Red 97 (C.I. 11232) instead of Disperse Red 13.

INK EXAMPLE 1

An ink composition is prepared by admixing 74 parts by weight of deionized water, 11 parts by weight of tripropylene glycol monomethyl ether (DOWANOL® TPM, available from Dow Chemical Co.), 10 parts by weight of dipropylene glycol, 0.05 parts by weight of polyethylene oxide (poly (ethylene glycol)-bisphenol A diglycidyl ether adduct molecular weight 18,500, available from Polysciences), and 5 parts by weight of the colored maleic anhydride polymer prepared as described in Example V.

The process is repeated with the colored maleic anhydride polymers prepared in Examples VI, XIII, XVII, XIX, and XX.

INK EXAMPLE 2

An ink is prepared by simple mixing of the following ingredients: 8 percent by weight of the colored maleic anhydride polymer prepared as described in Example V; 11.0 percent by weight DOWANOL® TPM (tripropylene glycol methyl ether; available from Dow Chemical Co., Midland, Mich.); 10 percent by weight diethylene glycol; 0.65 percent by weight tris(hydroxymethylamino)methane (buffering agent); 0.3 percent by weight EDTA (chelating agent); 0.1 percent by weight Dowicil® 150 (biocide; available from Dow Chemical Co., Midland, Mich.); 0.05 percent by weight polyethylene oxide (average molecular weight 18,500; available from Polysciences); and water (balance, to 100 weight percent).

The process is repeated with the colored maleic anhydride polymers prepared in Examples VI, XIII, XVII, XIX, and XX.

INK EXAMPLE 3

An ink composition is prepared by simple mixing of the following ingredients: 79.715 grams of deionized water; 0.075 gram of imidazole (available from BASF); 0.06 gram of ethylene diamine tetroacetic acid (available from Dow Chemical Co., Midland, Mich.); 0.15 gram of PROXEL GXL biocide (available from Zeneca Colors); 7.5 grams of sulfolane (95 wt. % sulfolane, 5 wt. % water; available from Phillips Petroleum Co.); 4.5 grams of formamide (available from Aldrich Chemical Co., Milwaukee, Wis.); 3 grams of DOWANOL TPM (available from Dow Chemical Co.); and 5 grams of the colored maleic anhydride polymer prepared as described in Example V.

The process is repeated with the colored maleic anhydride polymers prepared in Examples VI, XIII, XVII, XIX, and XX.

INK EXAMPLE 4

An ink composition is prepared by simple mixing of the following ingredients: 39 grams of deionized water; 0.25 gram of tris(hydroxymethyl) aminomethane (available from. American Biorganics); 0.25 gram of ethylene diamine tetraacetic acid (available from Dow Chemical Co., Midland, Mich.); 0.5 gram of PROXEL GXL biocide (available from Zeneca Colors); 5 grams of N-methyl pyrrolidinone (available from BASF); 15 grams of sulfolane (95 wt. % sulfolane, 5 wt. % water; available from Phillips Petroleum Co.); 15 grams of tetra(ethylene glycol) dimethyl ether (available from Aldrich Chemical Co., Milwaukee, Wis.); 10 grams of DOWANOL TPM (available from Dow Chemical Co., Midland, Mich.); and 15 grams of the colored maleic anhydride polymer prepared as described in Example V.

The process is repeated with the colored maleic anhydride polymers prepared in Examples VI, XIII, XVII, XIX, and XX.

INK EXAMPLE 5

An ink composition is prepared by simple mixing of the following ingredients: 64.271 grams of deionized water; 9 grams of sulfolane (95 wt. % sulfolane, 5 wt. % water; available from Phillips Petroleum Co.); 7.2 grams of acetylethanolamine (available from Scher Chemical); 7.2 grams of butyl carbitol (available from Van Waters & Rogers); 0.06 gram of DOWICIL® 150 biocide (available from Dow Chemical Co., Midland, Mich.); 0.03 gram of polyethylene oxide (bisphenol-A derivative, molecular weight 18,500; available from Polysciences); 0.039 gram of ethylene diamine tetraacetic acid (available from Dow Chemical Co.); 0.6 gram of imidazole (available from BASF); 3.6 grams of urea (available from Arcadian Corp.); and 8 grams of the colored maleic anhydride polymer prepared as described in Example V.

The process is repeated with the colored maleic anhydride polymers prepared in Examples VI, XIII, XVII, XIX, and XX.

APPLICATION EXAMPLE A

An ink composition is prepared as described in Ink Example 1. The ink thus prepared is used to fill a felt tipped marking pen, and marks are then made with the pen on plain paper. It is believed that the images thus generated will exhibit sharp lines, no feathering, smear resistance, and waterproof characteristics (as tested by running water from a faucet over the imaged paper).

The process is repeated with the inks prepared in Ink Examples 2, 3, 4, and 5. It is believed that similar results will be observed.

APPLICATION EXAMPLE B

An ink composition is prepared as described in Ink Example 1. The ink thus prepared is incorporated into a XEROX® M-750 thermal ink jet printer operated in normal mode and used to generate prints on HAMMERMILL® COPY PLUS paper. It is believed that the resulting prints will exhibit sharp lines, no feathering, smear resistance, and waterproof characteristics (as tested by running water from a faucet over the imaged paper).

The process is repeated with the inks prepared in Ink Examples 2, 3, 4, and 5. It is believed that similar results will be observed.

APPLICATION EXAMPLE C

An ink composition is prepared as described in Ink Example 1. The ink thus prepared is incorporated into an EPSON® Stylus color ink jet printer and used to generate prints on HAMMERMILL® COPY PLUS paper. It is believed that the resulting prints will exhibit sharp lines, no feathering, smear resistance, and waterproof characteristics (as tested by running water from a faucet over the imaged paper).

The process is repeated with the inks prepared in Ink Examples 2, 3, 4, and 5. It is believed that similar results will be observed.

Other embodiments and modifications occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. An ink composition comprising (a) an aqueous liquid vehicle, and (b) a colorant which comprises an anhydride-based copolymer having at least one chromogen covalently bonded thereto and at least one ester, amide, imide, or thioester group covalently bonded thereto, said colorant being soluble or dispersible in the aqueous liquid vehicle, wherein the ink has a viscosity at about 25° C. of no more than about 10 centipoise, wherein the anhydride-based copolymer has covalently bonded thereto a chromogen generated from one or more of (a) chromogenic compounds of the formula

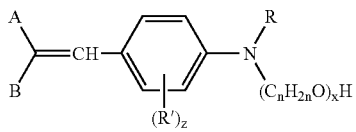

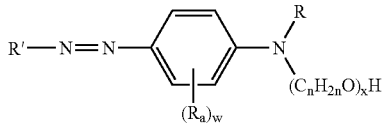

wherein R is an alkyl group, an aryl group, an arylalkyl group, or an alklaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule; (b) chromogenic compounds of the formula

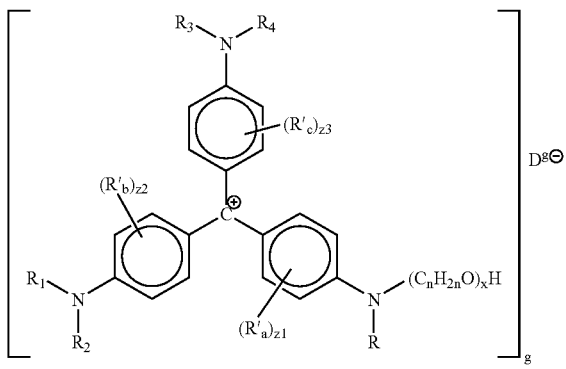

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R_b$, and $R'_c$, independently of the others, is a halogen atom, an alkyl group, an alkoxy group, a nitrile group, a nitro group, an amide group, or a sulfonamide group, $z_1$, $z_2$, and $z_3$ each, independently of the others, is an integer of 0, 1, 2, 3, or 4, n is an integer representing the number of carbon atoms in each repeat alkylene oxide unit, x is an integer representing the number of repeat alkylene oxide units, D is an anion, and g is the charge on the anion, wherein said colorant has no more than one —OH, —SH, or primary or secondary amino group per molecule; (c) chromogenic compounds of the formula wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule; (d) Disperse Red 13, Disperse Blue 34, Disperse Red 156, Disperse Red 90, Disperse Blue 85, Disperse Blue 8, Disperse Red 91, Disperse Red 55, Disperse Red 1, Disperse Blue 3, Basic Blue 41, Disperse Red 8, Disperse Red 98, Disperse Red 109, or Disperse Red 97; or (e) mixtures thereof.

2. An ink according to claim 1 wherein the anhydride-based copolymer comprises anhydride-based repeat units generated from monomers selected from the group consisting of maleic anhydride, itaconic anhydride, dimethyl maleic anhydride, chloromaleic anhydride, bromomaleic anhydride, iodomaleic anhydride, dichloromaleic anhydride, dibromomaleic anhydride, diiodomaleic anhydride, and mixtures thereof.

3. An ink according to claim 1 wherein the anhydride-based copolymer comprises nonanhydride-based repeat units generated from olefinically unsaturated monomers.

4. An ink according to claim 3 wherein the olefinically unsaturated monomers are of the formula

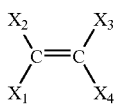

wherein $X_1$, $X_2$, $X_3$, and $X_4$ each, independently of the others, is a hydrogen atom, a halogen atom, a hydroxy group, an amine group, an ammonium group, a cyano group, a pyridine group, a pyridinium group, an ether group, a carbonyl group, a thiocarbonyl group, an aldehyde group, a ketone group, an ester group, an amide group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azide group, an azo group, a cyanato group, an isocyanato group, a thiocyanato group, an isothiocyanato group, a carboxylate group, a carboxylic acid group, a urethane group, a urea group, an alkyl group, an aryl group, an arylalkyl group, or an alkylaryl group.

5. An ink according to claim 3 wherein the olefinically unsaturated monomers are selected from the group consisting of butadiene, stilbene (1,2-diphenylethene), ethylene, 1-propylene, 1-butylene, 1-octadecene, vinyl ether, methoxyvinylether, methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, dimethylaminoethyl vinyl ether, styrene, methylstyrene, dimethylstyrene, trimethylstyrene, ethylstyrene, diethylstyrene, isopropylstyrene, butylstyrene, hexylstyrene, cyclohexylstyrene, decylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, trifluorostyrene, 2-bromo-4-trifluoromethylstyrene, acrylic acid, methacrylic acid, itaconic acid, maleic acid, citraconic acid, styrene sulfonic acid, vinylbenzylsulfonic acid, vinyl sulfonic acid, methyl acrylate, ethyl acrylate, n-propyl acrylate, isopropyl acrylate, n-butyl acrylate, isobutyl acrylate, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydoxypropyl acrylate, 2-methoxyethyl acrylate, 3-methoxybutyl acrylate, 2-ethoxyethyl acrylate, 2-isopropoxyethyl acrylate, 2-butyoxyethyl acrylate, 2-(2-methoxyethoxy) ethyl acrylate, 2-(2-butoxyethoxy) ethyl acrylate, 1-bromo-2-methoxyethyl acrylate, 1,1-dichloro-2-ethoxyethyl acrylate, methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate, benzylmethacrylate, chlorobenzyl methacrylate, octyl methacrylate, N-ethyl-N-phenylaminoethyl methacrylate, 2-(3-phenylpropyloxy) ethyl methacrylate, dimethylaminophenoxyethyl methacrylate, furfuryl methacrylate, acrylamide, methylacrylamide, tert-butylacrylamide, tert-octylacrylamide, benzylacrylamide, cyclohexylacrylamide, phenylacrylamide, dimethylacrylamide, dipropylacrylamide, hydroxyethyl-N-methylacrylamide, N-methylphenylacrylamide, N-ethyl-N-phenylacrylamide, methylmethacrylamide, tert-butylmethacrylamide, tert-octylmethacrylamide, benzylmethacrylamide, cyclohexylmethacrylamide, phenylmethacrylamide, dimethylmethacrylamide, dipropylmethacrylamide, hydroxyethyl-N-methylmethacrylamide, N-methylphenylmethacrylamide, N-ethyl-N-phenylmethacrylamide, methacrylhydrazine, methyl vinyl ketone, phenyl vinyl ketone, methoxyethyl vinyl ketone, vinyl chloride, vinylidene chloride, chlorotrifluoro ethylene, acrylonitrile, methacyrlonitrile, vinyl acetate, and mixtures thereof.

6. An ink according to claim 1 wherein the anhydride-based copolymer has a number average molecular weight of at least about 750.

7. An ink according to claim 1 wherein the anhydride-based copolymer has a number average molecular weight of no more than about 75,000.

8. An ink according to claim 1 wherein the anhydride-based copolymer has covalently bonded thereto a chromogen generated from (a) chromogenic compounds of the formula

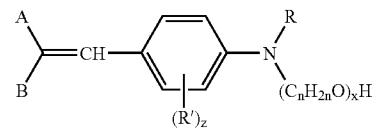

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule; (b) chromogenic compounds of the formula

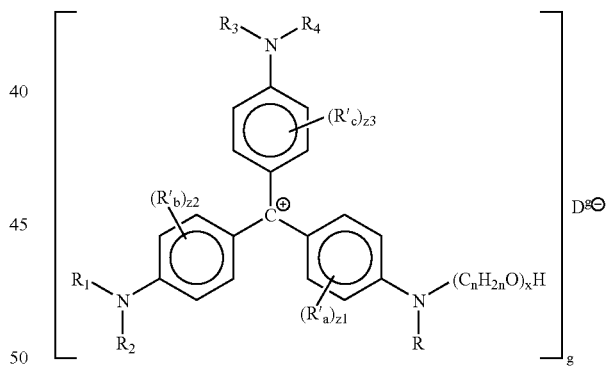

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R'_b$, and $R'_c$, independently of the others, is a halogen atom, an alkyl group, an alkoxy group, a nitrile group, a nitro group, an amide group, or a sulfonamide group, $z_1$, $z_2$, and $z_3$ each, independently of the others, is an integer of 0, 1, 2, 3, or 4, n is an integer representing the number of carbon atoms in each repeat alkylene oxide unit, x is an integer representing the number of repeat alkylene oxide units, D is an anion, and g is the charge on the anion, wherein said colorant has no more than one —OH, —SH, or primary or secondary amino group per molecule; (c) chromogenic compounds of the formula

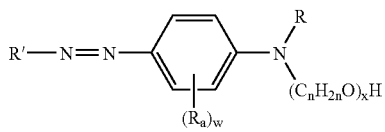

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule; or (d) mixtures thereof.

9. An ink according to claim 1 wherein the chromogen covalently bonded to the anhydride-based copolymer is generated from Disperse Red 13, Disperse Blue 34, Disperse Red 156, Disperse Red 90, Disperse Blue 85, Disperse Blue 8, Disperse Red 91, Disperse Red 55, Disperse Red 1, Disperse Blue 3, Basic Blue 41, Disperse Red 8, Disperse Red 98, Disperse Red 109, Disperse Red 97, or mixtures thereof.

10. An ink according to claim 1 wherein the chromogen covalently bonded to the anhydride-based copolymer is generated from

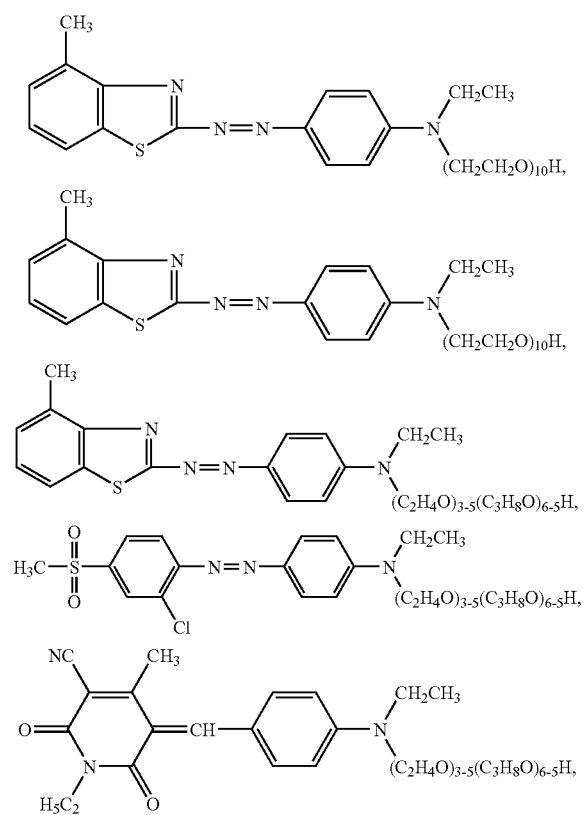

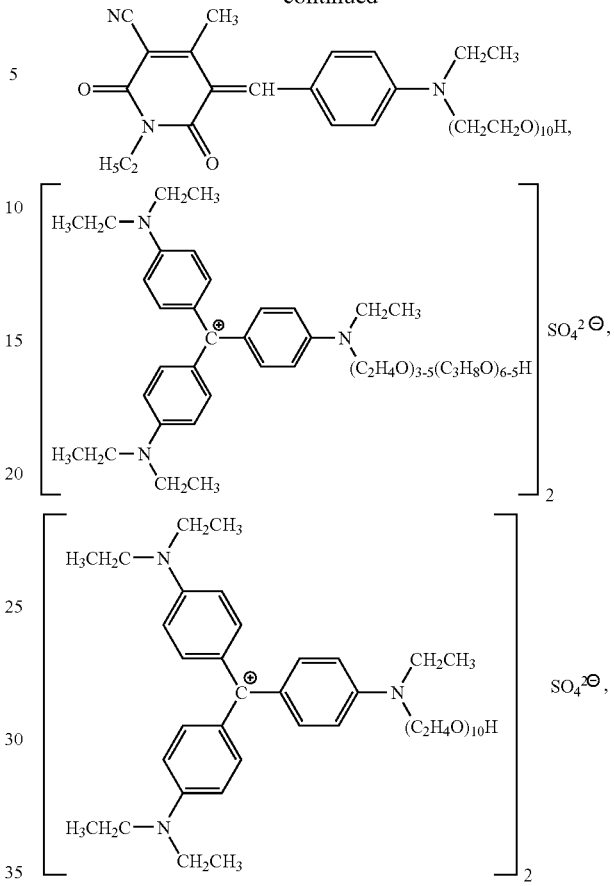

or mixtures thereof.

11. An ink according to claim 1 wherein the anhydride-based copolymer is generated by reacting an anhydride copolymer and a chromogenic compound in relative amounts of at least about 1.1 moles of anhydride repeat monomer units per every one mole of chromogenic compound.

12. An ink according to claim 1 wherein the anhydride-based copolymer is generated by reacting an anhydride copolymer and a chromogenic compound in relative amounts of no more than about 20 moles of anhydride repeat monomer units per every one mole of chromogenic compound.

13. An ink according to claim 1 wherein the ester, amide, imide, or thioester group covalently bonded to the anhydride-based copolymer is bonded to the anhydride-based copolymer by reacting an anhydride copolymer and a nonchromogenic monofunctional alcohol, a nonchromogenic monofunctional thiol, a nonchromogenic primary or secondary amine, or a mixture thereof.

14. An ink according to claim 13 wherein the nonchromogenic monofunctional alcohol is of the formula

R—OH wherein R is an alkyl group, an aryl group, an arylalkyl group, or an alkylaryl group.

15. An ink according to claim 13 wherein the nonchromogenic monofunctional alcohol is methanol, ethanol, linear and branched propanols, linear and branched butanols, linear and branched pentanols, linear and branched hexanols, linear and branched heptanols, linear and branched octanols, linear and branched nonanols, linear and branched decanols, linear and branched undecanols, linear and branched dodecanols, linear and branched tridecanols, linear and branched tetradecanols, linear and branched pentadecanols, linear and branched hexadecanols, linear and branched heptadecanols, linear and branched octadecanols, 3-cyclohexyl-1-propanol, 2-cyclohexyl-1-ethanol, cyclohexylmethanol, cyclohexanol, 4-methylcyclohexanol, 4-ethylcyclohexanol, 4-t-butylcyclohexanol, benzyl alcohol, octylphenol ethoxylate, octyl, nonyl, and dodecylphenol alkoxylates of octyl, nonyl, and dodecylphenol, and alkoxyphenol, phenol, naphthol, hydroabietyl alcohol, cholesterol, vitamin E, N,N-dimethyl-N-ethanolamine, stearamide-monoethanolamine, tripropyleneglycol monomethyl ether, hydroxybutanone, menthol, isobomeol, terpineol, 12-hydroxy stearyl stearamide, $C_{11}H_{22}$—O—$(CH_2CH_2O)_n$H wherein n has an average value of 3, or mixtures thereof.

16. An ink according to claim 13 wherein the nonchromogenic primary or secondary amine is of the formula

R—NHR' wherein R and R' each, independently of the other, are alkyl groups, aryl groups, arylalkyl groups, or alkylaryl groups, wherein R' can also be a hydrogen atom.

17. An ink according to claim 13 wherein the nonchromogenic primary or secondary amine is selected from the group consisting of methyl amine, ethyl amine, linear and branched propyl amines, linear and branched butyl amines, linear and branched pentyl amines, linear and branched hexyl amines, linear and branched heptyl amines, linear and branched octyl amines, linear and branched nonyl amines, linear and branched decyl amines, linear and branched undecyl amines, linear and branched dodecyl amines, linear and branched tridecyl amines, linear and branched tetradecyl amines, linear and branched pentadecyl amines, linear and branched hexadecyl amines, linear and branched heptadecyl amines, linear and branched octadecyl amines, dimethyl amine, diethyl amine, linear and branched dipropyl amines, linear and branched dibutyl amines, linear and branched dipentyl amines, linear and branched dihexyl amines, dicyclohexyl amine, linear and branched diheptyl amines, linear and branched dioctyl amines, linear and branched dinonyl amines, linear and branched didecyl amines, linear and branched diundecyl amines, linear and branched didodecyl amines, linear and branched ditridecyl amines, linear and branched ditetradecyl amines, linear and branched dipentadecyl amines, linear and branched dihexadecyl amines, linear and branched diheptadecyl amines, linear and branched dioctadecyl amines, 2-ethylhexyl amine, cyclohexyl amine, 2,3-dimethyl-1-cyclohexylamine, piperidine, pyrrolidine, benzyl amine, aniline, anisidine, rosin amine, abietic amine, dehydroabietyl amine, dihydroabietyl amine, hydroabietyl amine, adamantyl amine, isonipecotamide, polyoxyalkylenemonoamines, 3,3'-diamino-N-methyldipropylamine, and mixtures thereof.

18. An ink according to claim 13 wherein the nonchromogenic monofunctional thiol is of the formula

R—SH wherein R is an alkyl group, an aryl group, an arylalkyl group, or an alkylaryl group.

19. An ink according to claim 13 wherein the nonchromogenic monofunctional thiol is selected from the group consisting of methyl mercaptan, ethyl mercaptan, linear and branched propyl mercaptans, linear and branched butyl mercaptans, linear and branched pentyl mercaptans, linear and branched hexyl mercaptans, linear and branched heptyl mercaptans, linear and branched octyl mercaptans, linear and branched nonyl mercaptans, linear and branched decyl mercaptans, linear and branched undecyl mercaptans, linear and branched dodecyl mercaptans, linear and branched tridecyl mercaptans, linear and branched tetradecyl mercaptans, linear and branched pentadecyl mercaptans, linear and branched hexadecyl mercaptans, linear and branched heptadecyl mercaptans, linear and branched octadecyl mercaptans, 3-cyclohexyl-1-propyl mercaptan, 2-cyclohexyl-1-ethyl mercaptan, cyclohexylmethyl mercaptan, cyclohexyl mercaptan, 4-methyl cyclohexyl mercaptan, 4-ethylcyclohexyl mercaptan, 4-t-butylcyclohexyl mercaptan, benzyl mercaptan, phenyl mercaptan, naphthyl mercaptan, hydroabietyl mercaptan, and mixtures thereof.

20. An ink according to claim 13 wherein the nonchromogenic monohydroxyl alcohol, nonchromogenic monofunctional thiol, nonchromogenic monofunctional amine, or mixture thereof is reacted with the anhydride copolymer in relative amounts of at least about 1.1 moles of anhydride repeat monomer units per every one mole of nonchromogenic monofunctional alcohol, thiol, amine, or mixture thereof.

21. An ink according to claim 13 wherein the nonchromogenic monohydroxyl alcohol, nonchromogenic monofunctional thiol, nonchromogenic monofunctional amine, or mixture thereof is reacted with the anhydride copolymer in relative amounts of no more than about 20 moles of anhydride repeat monomer units per every one mole of nonchromogenic monofunctional alcohol, thiol, amine, or mixture thereof.

22. An ink according to claim 1 wherein the anhydride-based copolymer also has at least one antioxidant or UV stabilizer moiety covalently bonded thereto.

23. An ink according to claim 22 wherein the antioxidant or UV stabilizer moiety is covalently bonded to the anhydride copolymer by reacting an anhydride copolymer with an antioxidant or UV stabilizer molecule having thereon (A) at least one isocyanate-reactive hydroxyl group and/or (B) at least one isocyanate-reactive primary or secondary amino group.

24. An ink according to claim 23 wherein the antioxidant or UV stabilizer molecule is selected from the group consisting of hydroxybenzophenones, hydroxybenzotriazines, hindered amines, butylated hydroxytoluenes, diaromatic secondary amines, diphenyl acrylonitrile esters, cinnamates, trisaryl-1,3,5-triazines, and mixtures thereof.

25. An ink according to claim 23 wherein the antioxidant or UV stabilizer molecule is selected from the group consisting of (1) those of the formula

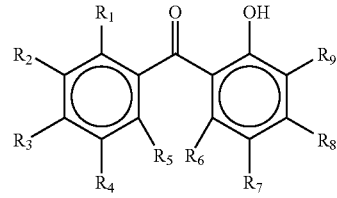

wherein, provided that at least one of $R_1$, $R_2$, $R_3$, $R_4$, $R_5$, $R_6$, $R_7$, $R_8$, and $R_9$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_1$, $R_2$, $R_3$, $R_4$, $R_5$, $R_6$, $R_7$, $R_8$, and $R_9$ each, independently of the others, is (i) a hydrogen atom, (ii) a hydroxy group, (iii) an amino group of the formula —$NR_{10}R_{11}$, wherein $R_{10}$ and $R_{11}$ each, independently of the others, is a hydrogen atom, an alkyl group as defined for $R_1$, $R_2$, $R_3$, $R_4$, $R_5$, $R_6$, $R_7$, $R_8$, and $R_9$, an aryl group as defined for $R_1$, $R_2$, $R_3$, $R_4$, $R_5$, $R_6$, $R_7$, $R_8$, and $R_9$, an arylalkyl group as defined for $R_1$, $R_2$, $R_3$, $R_4$, $R_5$, $R_6$, $R_7$, $R_8$, and $R_9$, or an alkylaryl group as defined for $R_1$, $R_2$, $R_3$, $R_4$, $R_5$, $R_6$, $R_7$, $R_8$, and $R_9$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (2) those of the formula

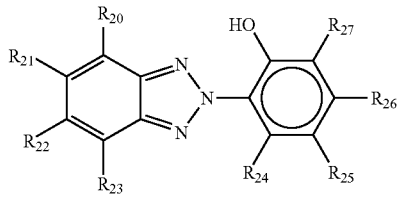

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group as defined for $R_{20}$, $R_{21}$, $R_{23}$, $R_{23}$, $R_{24}$, $R_{25}$, $R_{26}$, and $R_{27}$, an aryl group as defined for $R_{20}$, $R_{21}$, $R_{23}$, $R_{23}$, $R_{24}$, $R_{25}$, $R_{26}$, and $R_{27}$, an arylalkyl group as defined for $R_{20}$, $R_{21}$, $R_{23}$, $R_{23}$, $R_{24}$, $R_{25}$, $R_{26}$, and $R_{27}$, or an alkylaryl group as defined for $R_{20}$, $R_{21}$, $R_{23}$, $R_{23}$, $R_{24}$, $R_{25}$, $R_{26}$, and $R_{27}$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (3) those of the formula

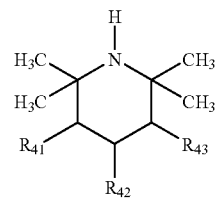

wherein, provided that at least one of $R_{41}$, $R_{42}$, and $R_{43}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{41}$, $R_{42}$, and $R_{43}$ each, independently of the others, is (i) a hydrogen atom, (ii) a hydroxy group, (iii) an amino group of the formula —$NR_{44}R_{45}$, wherein $R_{44}$ and $R_{45}$ each, independently of the others, is a hydrogen atom, an alkyl group as defined for $R_{41}$, $R_{42}$, and $R_{43}$, an aryl group as defined for $R_{41}$, $R_{42}$, and $R_{43}$, an arylalkyl group as defined for $R_{41}$, $R_{42}$, and $R_{43}$, or an alkylaryl group as defined for $R_{41}$, $R_{42}$, and $R_{43}$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (4) those of the formula

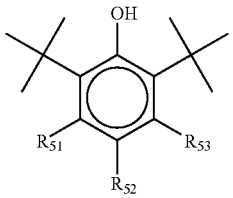

wherein, provided that at least one of $R_{51}$, $R_{52}$, and $R_{53}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{51}$, $R_{52}$, and $R_{53}$ each, independently of the others, is (1) a hydrogen atom, (ii) a hydroxy group, (iii) an amino group of the formula —$NR_{54}R_{55}$, wherein $R_{54}$ and $R_{55}$ each, independently of the others, is a hydrogen atom, an alkyl group as defined for $R_{51}$, $R_{52}$, and $R_{53}$, an aryl group as defined for $R_{51}$, $R_{52}$, and $R_{53}$, an arylalkyl group as defined for $R_{51}$, $R_{52}$, and $R_{53}$, or an alkylaryl group as defined for $R_{51}$, $R_{52}$, and $R_{53}$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (5) those of the formula

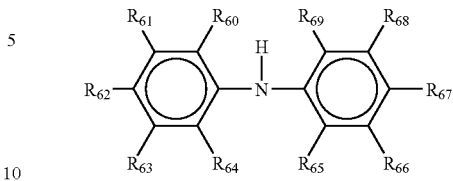

wherein, provided that at least one of $R_{60}$, $R_{61}$, $R_{62}$, $R_{63}$, $R_{64}$, $R_{65}$, $R_{66}$, $R_{67}$, $R_{68}$, and $R_{69}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{60}$, $R_{61}$, $R_{62}$, $R_{63}$, $R_{64}$, $R_{65}$, $R_{66}$, $R_{67}$, $R_{68}$, and $R_{69}$ each, independently of the others, is (i) a hydrogen atom, (ii) a hydroxy group, (iii) an amino group of the formula —$NR_{58}R_{59}$, wherein $R_{58}$ and $R_{59}$ each, independently of the others, is a hydrogen atom, an alkyl group as defined for $R_{60}$, $R_{61}$, $R_{62}$, $R_{63}$, $R_{64}$, $R_{65}$, $R_{66}$, $R_{67}$, $R_{68}$, and $R_{69}$, an aryl group as defined for $R_{60}$, $R_{61}$, $R_{62}$, $R_{63}$, $R_{64}$, $R_{65}$, $R_{66}$, $R_{67}$, $R_{68}$, and $R_{69}$, an arylalkyl group as defined for $R_{60}$, $R_{61}$, $R_{62}$, $R_{63}$, $R_{64}$, $R_{65}$, $R_{66}$, $R_{67}$, $R_{68}$, and $R_{69}$, or an alkylaryl group as defined for $R_{60}$, $R_{61}$, $R_{62}$, $R_{63}$, $R_{64}$, $R_{65}$, $R_{66}$, $R_{67}$, $R_{68}$, and $R_{69}$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (6) those of the formula

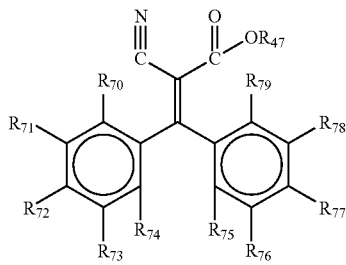

wherein, provided that at least one of $R_{47}$, $R_{70}$, Rn, $R_{72}$, $R_{73}$, $R_{74}$, $R_{75}$, $R_{76}$, $R_{77}$, $R_{78}$, and $R_{79}$, is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (i) a hydrogen atom, (ii) a hydroxy group, (iii) an amino group of the formula —$NR_{48}R_{49}$, wherein $R_{48}$ and $R_{49}$ each, independently of the others, is a hydrogen atom, an alkyl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, an aryl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, an arylalkyl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, or an alkylaryl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, and further wherein $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (7) those of the formula

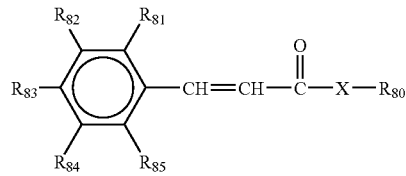

wherein, provided that at least one of $R_{80}$, $R_{81}$, $R_{82}$, $R_{83}$, $R_{84}$, and $R_{85}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, (a) X is (i) an oxygen atom, (ii) a sulfur atom, (iii) a group of the formula —$NR_{86}$-, wherein $R_{86}$ is an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, or (iv) a group of the formula —$CR_{87}R_{57}$-, wherein $R_{87}$ and $R_{57}$ each, independently of the others, is a hydrogen atom, an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, and (b) $R_{80}$, $R_{81}$, $R_{82}$, $R_{83}$, $R_{84}$, and $R_{85}$ each, independently of the others, is (i) a hydrogen atom, (ii) a hydroxy group, (iii) an amino group of the formula -$NR_{88}R_{89}$, wherein $R_{88}$ and $R_{89}$ each, independently of the others, is a hydrogen atom, an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; (8) those of the formula

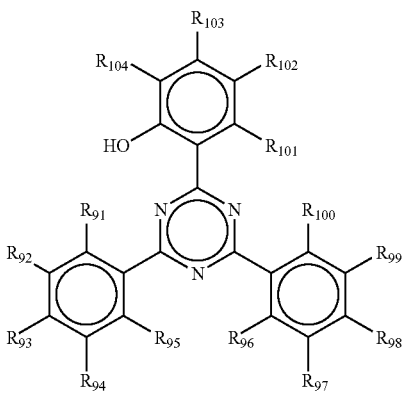

wherein, provided that at least one of $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ each, independently of the others, is (i) a hydrogen atom, (ii) a hydroxy group, (iii) an amino group of the formula —$NR_{105}R_{106}$, wherein $R_{105}$ and $R_{106}$ each, independently of the others, is a hydrogen atom, an alkyl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, an aryl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, an arylalkyl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, or an alkylaryl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group; and (9) mixtures thereof.

26. An ink according to claim 23 wherein the antioxidant or UV stabilizer molecule is selected from the group consisting of 2,4-dihydroxybenzophenone, 2,2,4,4'-tetrahydroxybenzophenone, 2,4,4'-trihydroxybenzophenone, 3-(2H-benzotriazol-2-yl)-4-hydroxyphenethyl alcohol, 2-(2H-benzotriazol-2-yl)-4-(1-hydroxyethyl) phenol, 2,2,6,6-tetramethyl-4-piperidinol, 7,7,9,9-tetra methyl-1,4-dioxa-8-azaspiro [4.5] decane-2-methanol, 2,2,6,6-tetramethyl-4-piperidinamine, 2,6-di-tert-butyl-4-hydroxymethylphenol, 3,5-di-tert-butyl-4-hydroxybenzoic acid, 4,4-diaminophenylamine, N-phenyl-1,4-phenylenediamine, 3-phenyl-3-(p-hydroxyphenyl)-2-carboxyethyl-acrylonitrile, 4-methoxy cinnamic acid, a compound of the formula

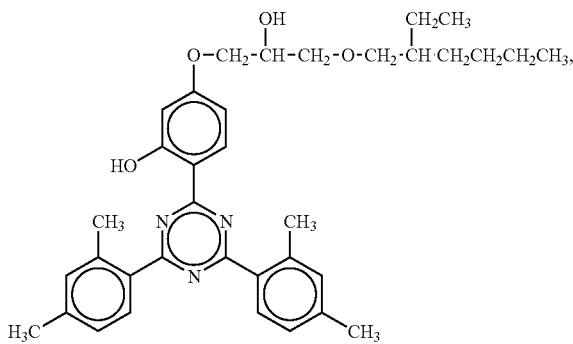

and mixtures thereof.

27. An ink according to claim 23 wherein the antioxidant or UV stabilizer molecule and the anhydride copolymer are present in relative amounts of at least about 1.1 moles of anhydride repeat monomer units per every one mole of antioxidant or UV stabilizer molecule.

28. An ink according to claim 23 wherein the antioxidant or UV stabilizer molecule and the anhydride copolymer are present in relative amounts of no more than about 20 moles of anhydride repeat monomer units per every one mole of antioxidant or UV stabilizer molecule.

29. An ink according to claim 1 wherein the colorant is present in the ink in an amount of at least about 1 percent by weight of the ink.

30. An ink according to claim 1 wherein the colorant is present in the ink in an amount of no more than about 99 percent by weight of the ink.

31. An ink according to claim 1 further comprising a base.

32. An ink according to claim 31 wherein the base is lithium hydroxide, sodium hydroxide, potassium hydroxide, ammonia, triethylamine, triethanolamine, quaternary ammonium hydroxides, or mixtures thereof.

33. An ink composition comprising (a) an aqueous liquid vehicle, and (b) a colorant which is the reaction product of (1) an anhydride copolymer, (2) a chromogenic compound having one and only one group per molecule selected from the group consisting of —OH, —SH, primary amino, and secondary amino, and (3) a material selected from the group consisting of nonchromogenic monofunctional alcohols, nonchromogenic monofunctional thiols, nonchromogenic monofunctional primary or secondary amines, and mixtures thereof, said colorant being soluble or dispersible in the aqueous liquid vehicle, wherein the ink has a viscosity at about 25° C. of no more than about 10 centipoise, wherein the chromogenic compound is (a) of the formula

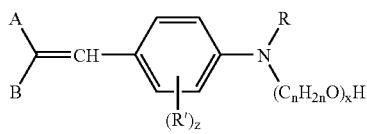
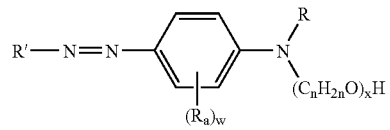

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule; (b) of the formula

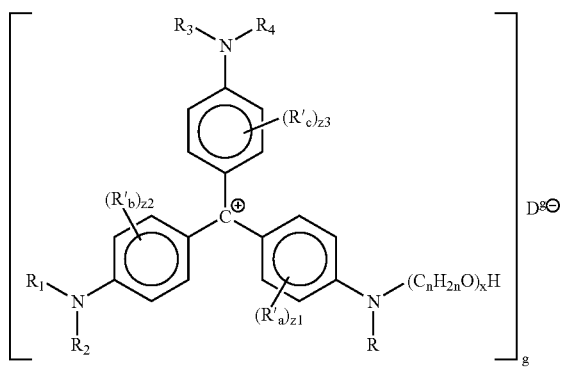

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R_b$, and $R'_c$, independently of the others, is a halogen atom, an alkyl group, an alkoxy group, a nitrile group, a nitro group, an amide group, or a sulfonamide group, $z_1$, $z_2$, and $z_3$ each, independently of the others, is an integer of 0, 1, 2, 3, or 4, n is an integer representing the number of carbon atoms in each repeat alkylene oxide unit, x is an integer representing the number of repeat alkylene oxide units, D is an anion, and g is the charge on the anion, wherein said colorant has no more than one —OH, —SH, or primary or secondary amino group per molecule; (c) of the formula wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule; (d) Disperse Red 13, Disperse Blue 34, Disperse Red 156, Disperse Red 90, Disperse Blue 85, Disperse Blue 8, Disperse Red 91, Disperse Red 55, Disperse Red 1, Disperse Blue 3, Basic Blue 41, Disperse Red 8, Disperse Red 98, Disperse Red 109, or Disperse Red 97; or (e) mixtures thereof.

34. A process which comprises applying an ink composition according to claim 1 to a recording substrate in an imagewise pattern.

35. A process which comprises incorporating into an ink jet printing apparatus an ink composition according to claim 1 and causing droplets of the inks to be ejected in an imagewise pattern onto a recording substrate.

36. A process according to claim 35 wherein the printing apparatus employs a thermal ink jet process wherein the ink in the nozzles is selectively heated in an imagewise pattern, thereby causing droplets of the ink to be ejected in imagewise pattern.

37. A process according to claim 35 wherein the printing apparatus employs a piezoelectric ink jet process wherein droplets of the ink are caused to be ejected in imagewise pattern by oscillations of piezoelectric vibrating elements.

38. An ink composition according to claim 33 wherein the chromogenic compound is

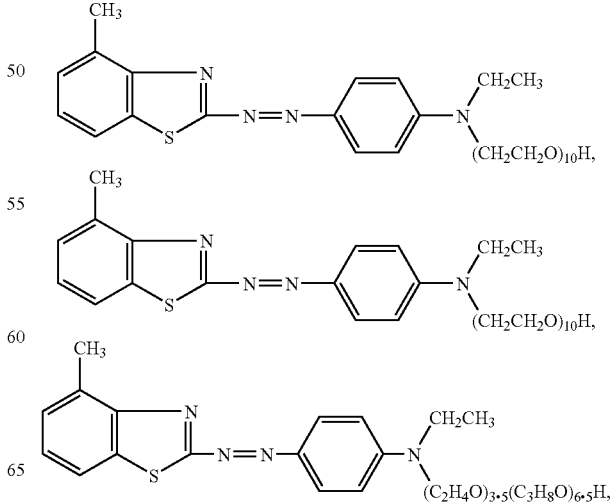

-continued
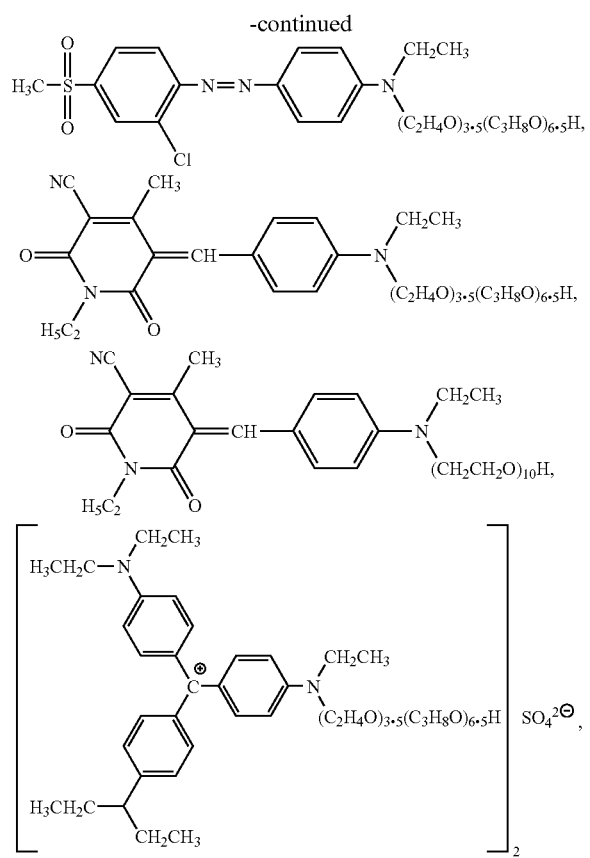
-continued
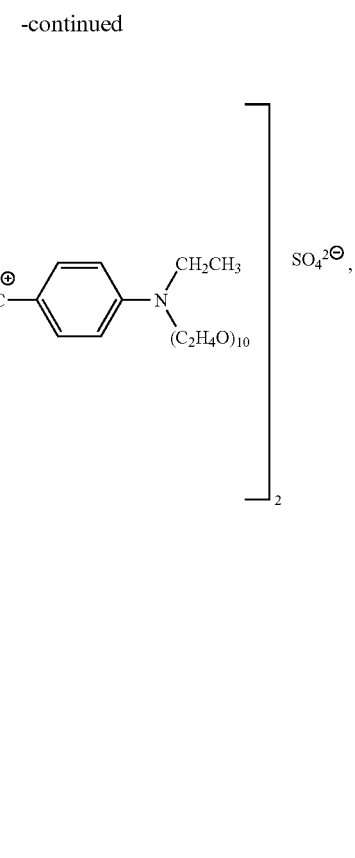
or mixtures thereof.
* * * * *